United States Patent [19]
Stevens et al.

[11] Patent Number: 5,797,503
[45] Date of Patent: Aug. 25, 1998

[54] MODULAR STORAGE SYSTEM WITH AN ACTIVE STORAGE LEVEL FEATURE

[75] Inventors: Kenneth A. Stevens, Harleysville; Jonathan M. Daugherty, Wilkes-Barre; David R. McGovern, Wilkes-Barre; Joseph P. Jones, Wilkes-Barre, all of Pa.

[73] Assignee: Metro Industries, Inc., Reno, Nev.

[21] Appl. No.: 426,654

[22] Filed: Apr. 21, 1995

[51] Int. Cl.⁶ .................................................. A47B 43/00
[52] U.S. Cl. ...................... 211/187; 211/186; 211/162; 108/107; 108/193
[58] Field of Search ...................... 211/134, 151, 211/162, 175, 181, 186, 187; 108/181, 193, 143, 107; 312/330.1, 334.8, 334.9, 334.11, 334.12, 334.15, 339.29; 70/79, 80, 81

[56] References Cited

U.S. PATENT DOCUMENTS

| | | | |
|---|---|---|---|
| D. 323,915 | 2/1992 | Welch | D34/21 |
| 1,301,495 | 4/1919 | Otte | 312/334.8 X |
| 1,376,494 | 5/1921 | Wickstrom | 312/334.8 |
| 2,805,106 | 9/1957 | Penkala | 312/334.9 X |
| 2,977,173 | 3/1961 | Hertzman | 211/186 X |
| 3,056,507 | 10/1962 | Squires, Jr. et al. | 108/107 X |

(List continued on next page.)

FOREIGN PATENT DOCUMENTS 8906763 7/1989 Germany.

OTHER PUBLICATIONS

Bosch Flexible Automation. Bosch Aluminum Structural Framing System, Sales Brochure (date unknown).

The Bin Systems, Drustar, Drug Control System, Sales Brochure (date unknown).

Artromic International, Medication Carts Sales Brochure (date unknown).

Basic Mechanical Elements, Bosch Flexible Automation. Sales Catalog, Airline Hydraulics Corporation (dte unknown).

*Primary Examiner*—Alvin C. Chin-Shue
*Assistant Examiner*—Sandra Snapp
*Attorney, Agent, or Firm*—Fitzpatrick, Cella, Harper & Scinto

[57] ABSTRACT

A modular shelving system includes active and fixed storage levels. The storage levels are removably supported from support posts and are disposed at intermediate positions between a top shelf assembly and a base shelf assembly. Each active storage level is secured to a pair of slide assemblies allowing such to be displaced from the shelving system to provide convenient access to items stored thereon. The support posts may be in the form of cylinders having an array of vertical slots for receiving mounting hardware for supporting shelves. Alternatively, support posts having longitudinal slots formed therein in combination with slotted-post inserts may be used to support the shelves. An anti-tip leg assembly can optionally be employed to provide increased stability.

47 Claims, 17 Drawing Sheets

U.S. PATENT DOCUMENTS

| | | | |
|---|---|---|---|
| 3,138,123 | 6/1964 | Maslow | 108/159 |
| 3,208,408 | 9/1965 | Maslow | 108/148 |
| 3,221,894 | 12/1965 | Knuth | 211/187 X |
| 3,316,864 | 5/1967 | Maslow | 108/148 |
| 3,399,784 | 9/1968 | Buchbinder et al. | 211/151 |
| 3,424,111 | 1/1969 | Maslow | 211/153 |
| 3,523,508 | 8/1970 | Maslow | 108/144 |
| 3,757,705 | 9/1973 | Maslow | 108/144 |
| 3,874,511 | 4/1975 | Maslow | 211/153 |
| 3,896,743 | 7/1975 | Pariente | 211/186 X |
| 4,191,436 | 3/1980 | Cherry | 312/334.11 |
| 4,475,778 | 10/1984 | Stark | 312/334.1 |
| 4,589,349 | 5/1986 | Gebhardt et al. | 211/181 X |
| 4,595,107 | 6/1986 | Welsch | 211/181 X |
| 4,629,077 | 12/1986 | Niblock | 211/187 |
| 4,635,801 | 1/1987 | Oren | 211/94 X |
| 4,637,323 | 1/1987 | Nicely | 108/107 |
| 4,687,404 | 8/1987 | Seiz et al. | 211/151 X |
| 4,799,818 | 1/1989 | Sudimak et al. | 403/107 |
| 4,811,670 | 3/1989 | Kolvites et al. | 108/107 |
| 4,811,999 | 3/1989 | Remington et al. | 312/250 |
| 4,892,044 | 1/1990 | Welsch | 108/154 |
| 4,964,350 | 10/1990 | Kolvites et al. | 108/110 |
| 4,989,519 | 2/1991 | Welsch et al. | 108/111 |
| 5,016,948 | 5/1991 | Welsch et al. | 312/250 |
| 5,069,466 | 12/1991 | Propst | 211/186 X |
| 5,205,630 | 4/1993 | Welch et al. | 312/330.1 X |
| 5,350,073 | 9/1994 | Thornley et al. | 211/187 |
| 5,377,851 | 1/1995 | Asano et al. | 211/191 |
| 5,390,803 | 2/1995 | McAllister | 211/187 X |
| 5,415,302 | 5/1995 | Carlson et al. | 211/187 |
| 5,466,060 | 11/1995 | Hoffman | 312/334.8 |
| 5,481,988 | 1/1996 | Dess | 108/193 X |
| 5,507,571 | 4/1996 | Hoffman | 312/334.8 |

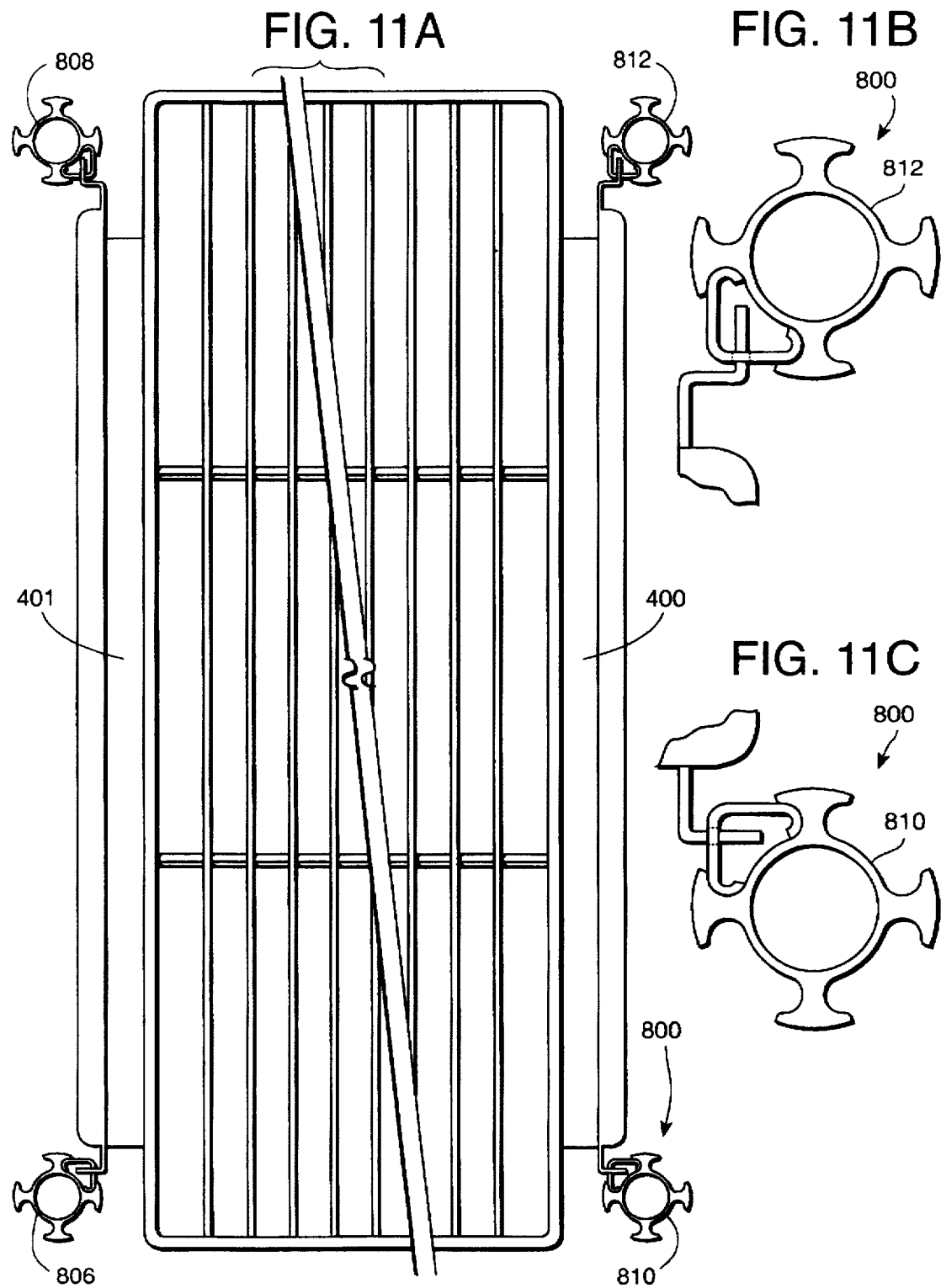

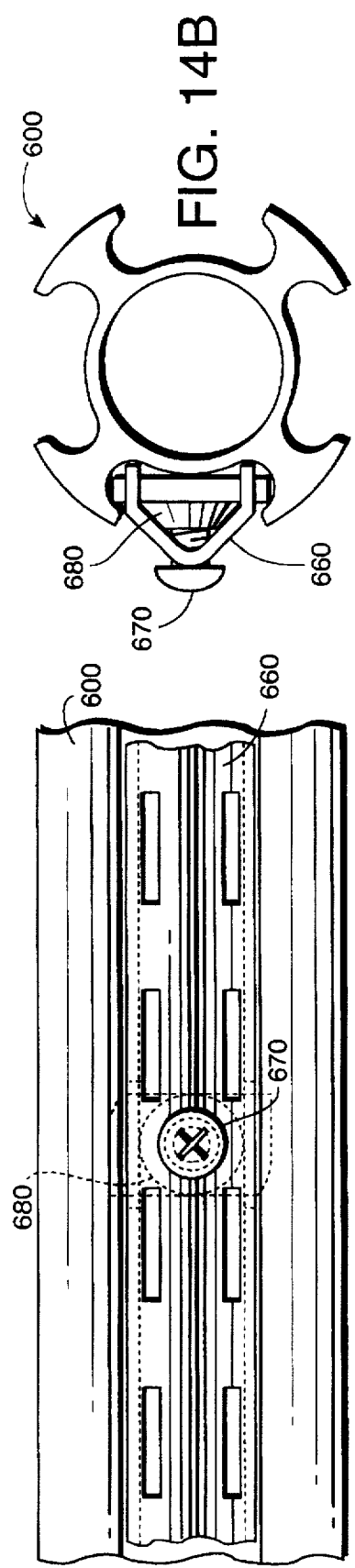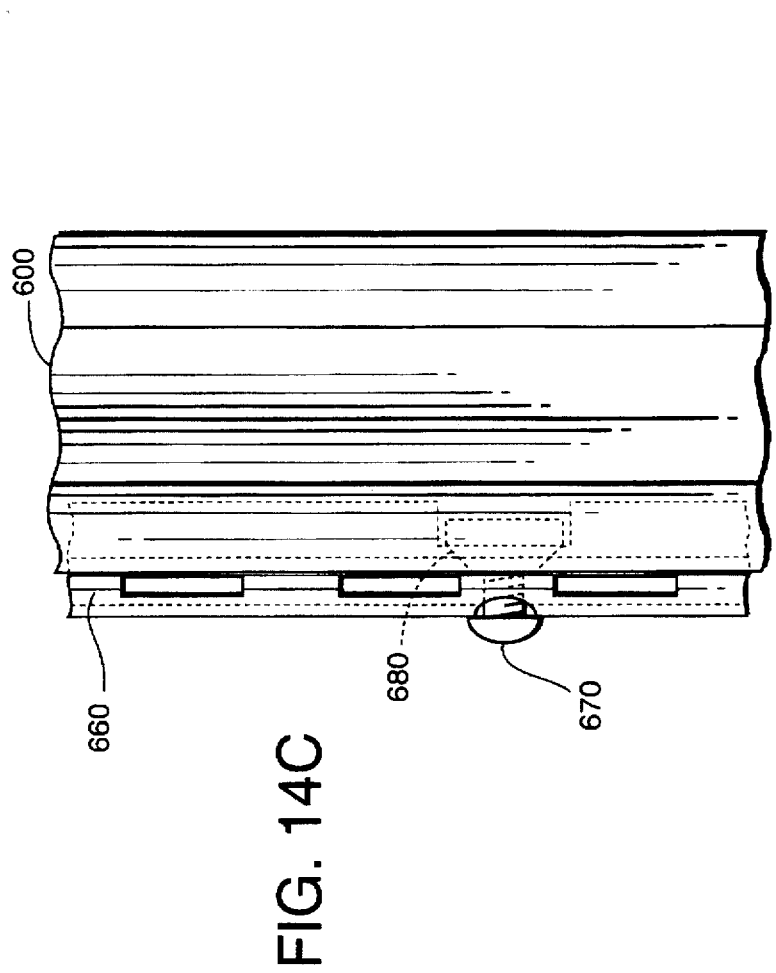

5,797,503

MODULAR STORAGE SYSTEM WITH AN ACTIVE STORAGE LEVEL FEATURE

BACKGROUND OF THE INVENTION

1. Field of the Invention

The present invention generally relates to a modular storage system. More particularly, the present invention relates to a modular storage shelving system, such as an "open" or "fixed-shelf" system, in combination with a "closed" storage system, such as a "drawer-type" system. The present invention is well suited to a variety of commercial, industrial, and residential applications and may be readily assembled and disassembled, without special tools, to facilitate moving, shipping, storing, and cleaning.

Modular, open storage systems, such as fixed-shelf systems, are very efficient when used to store like shaped and sized items inasmuch as the spacing between the shelves need only be slightly larger than the height of the stored items. However, if a variety of differently shaped and sized items are to be stored, the spacing between the shelves must be increased to allow a person to view and to access all of the items placed along the entire length and width of each shelf. This "storing of air" constitutes an inefficiency not present in a closed system, wherein each drawer can be pulled out to readily view and access all of the stored items. However, closed or drawer-type storage systems may be disadvantageous in that the stored items are not readily viewable or accessible without pulling out each drawer.

2. Description of the Prior Art

Modular or knockdown shelving systems are well known in the art. For example, U.S. Pat. Nos. 3,138,123 (Maslow) and 3,208,408 (Maslow) disclose knockdown shelving systems marketed by InterMetro Industries Corporation under its trademark ERECTA SHELF®.

U.S. Pat. Nos. 3,424,111 (Maslow) and 3,523,508 (Maslow) disclose another modular adjustable shelving system also marketed by Intermetro Industries Corporation under its trademark SUPER ERECTA SHELF®.

The SUPER ERECTA SHELF® shelving system comprises a wire rod shelf having a frustoconically shaped collar at each corner for receiving a support post. Each collar tapers outwardly toward its lower extremity when viewed in normal use. Thus, each collar is wider at its bottom than at its top. Generally, cylindrical support posts, each having a plurality of uniformly spaced annular grooves formed in its outer surface, may be provided to support the shelving system. Each shelf is secured to the support posts by means of complementary, split sleeves, which are used in pairs to at least partially surround the support post to define a sleeve assembly. A rib formed on an inside surface of each split sleeve is sized to engage the grooves formed in the support posts. The sleeve assembly is wider at its bottom than at its top and is sized to fit snugly within a collar when positioned around a support post. Accordingly, a collar at each corner of the shelf secures a sleeve assembly to a support post, with the result that one corner of the shelf is supported. The other corners of the shelf are supported in like fashion.

To assemble a shelving system, the split sleeves are first placed, in pairs, about each support post such that the rib formed on the inside surface of each sleeve split engages a groove in the support post at the desired height. Each of the support posts with the split sleeves mounted thereon is then passed through a collar at a respective corner of each shelf. The collars, sleeve assemblies, and support posts firmly engage each other due to their relative respective sizes.

When all support posts are inserted, the shelving system is placed in position and is ready for use. As the load on the shelf increases, a radially inwardly directed force urges the sleeve assemblies into a locking relationship with the support posts.

Other examples of known shelving systems are disclosed in U.S. Pat. No. 3,757,705 (Maslow); U.S. Pat. No. 3,316,864 (Maslow); U.S. Pat. No. 4,629,077 (Niblock); U.S. Pat. No. 4,799,818 (Sudimak, et al.); U.S. Pat. No. 4,811,670 (Kolvites, et al.); U.S. Pat. No. 4,892,044 (Welsch); U.S. Pat. No. 4,964,350 (Kolvites, et al.); and U.S. Pat. No. 4,989,519 (Welsch, et al.).

Although the foregoing shelving systems are well suited for many varied applications, there is a need for a modular, open storage system featuring fixed- and active-level storage units that offers the advantages not only of a closed storage system, but also the advantages of an open shelving system. Such a storage system would allow for the easy installation or removal of one or more fixed and active levels without requiring the disassembly of the entire storage system.

SUMMARY OF THE INVENTION

It is an object of the present invention to provide a storage system improving upon the modular, fixed-type shelving systems known in the prior art.

It is another object of the present invention to provide a storage system featuring one or more active-level storage units in combination with a fixed-type shelving system, which may be installed and removed without disassembly of the entire storage system.

It is yet another object of the present invention to provide a combined, inexpensive, modular, open, fixed-and active-level storage system that can be readily assembled and disassembled with minimal effort and without special tools, yet still has high strength, stability, and rigidity.

It is a further object of the present invention to provide a substantially open, wire rod modular storage system with fixed and active storage units which is aesthetically pleasing, simply fabricated, stable in use, corrosion resistant, and readily cleanable.

In furtherance of the foregoing objects, the present invention in one aspect is directed to a storage system having a plurality of support posts, base and top assemblies mounted thereto, and an active-level storage unit supported thereby, the assembly being slidably movable relative to the plurality of support posts.

The present invention in a second aspect is directed to a storage system having a plurality of support posts to which base and top assemblies are mounted, the posts supporting an active-level shelf assembly which is slidably movable relative to the support posts.

The present invention in another aspect is directed to a storage system having a plurality of support posts; base and top shelf assemblies mounted thereto; a pair of shelf mounting assemblies, each of which is detachably mountable to an opposing pair of the support posts disposed between the top and base shelf assemblies; and an active-level shelf assembly supported by at least one pair of the shelf mounting assemblies disposed between the base and top shelf assemblies.

The present invention in a further aspect is directed to an active-level storage unit for use in a storage system having a plurality of support posts that comprises a multi-sided frame assembly and a pair of slide mounting assemblies secured to respective pairs of the plurality of support posts, each slide mounting assembly being mounted to opposing sides of said frame assembly and the frame assembly being slidably mounted relative to the plurality of support posts.

The present invention in an additional aspect is directed to an anti-tip assembly for use with a storage system having a top assembly, a base assembly, and an active-level storage unit, including a guide tube secured to the base assembly and a substantially L-shaped leg partially disposed and slidable within the guide tube cooperating in movement with the active-level storage unit.

A more complete appreciation, along with an understanding of other aspects, objects, features, and advantages of the present invention, will become apparent from the following detailed description when considered in conjunction with the accompanying drawings.

BRIEF DESCRIPTION OF THE DRAWINGS

FIG. 11A is a fragmented plan view of an installed shelf using four support posts of the type shown in FIGS. 8A through 8C, four slotted-post inserts of the type shown in 9A through 9C, and two pair of the mounting bracket shown in 10A through 10C.

FIG. 11B is a detail view taken from FIG. 11A showing the relationship of a portion of a rear mounting bracket and a slotted-post insert.

FIG. 11C is another detail view taken from FIG. 11A showing the relationship of a portion of a front mounting bracket and a slotted-post insert.

FIGS. 14A through 14C, respectively, are fragmented top, fragmented side, and end views of the slotted-post insert shown in FIGS. 12A through 12D secured to the slotted post shown in FIGS. 8A through 8C using the insert lock shown in FIGS. 13A through 13C and a threaded fastener.

DETAILED DESCRIPTION OF THE PREFERRED EMBODIMENTS

Figure 1:
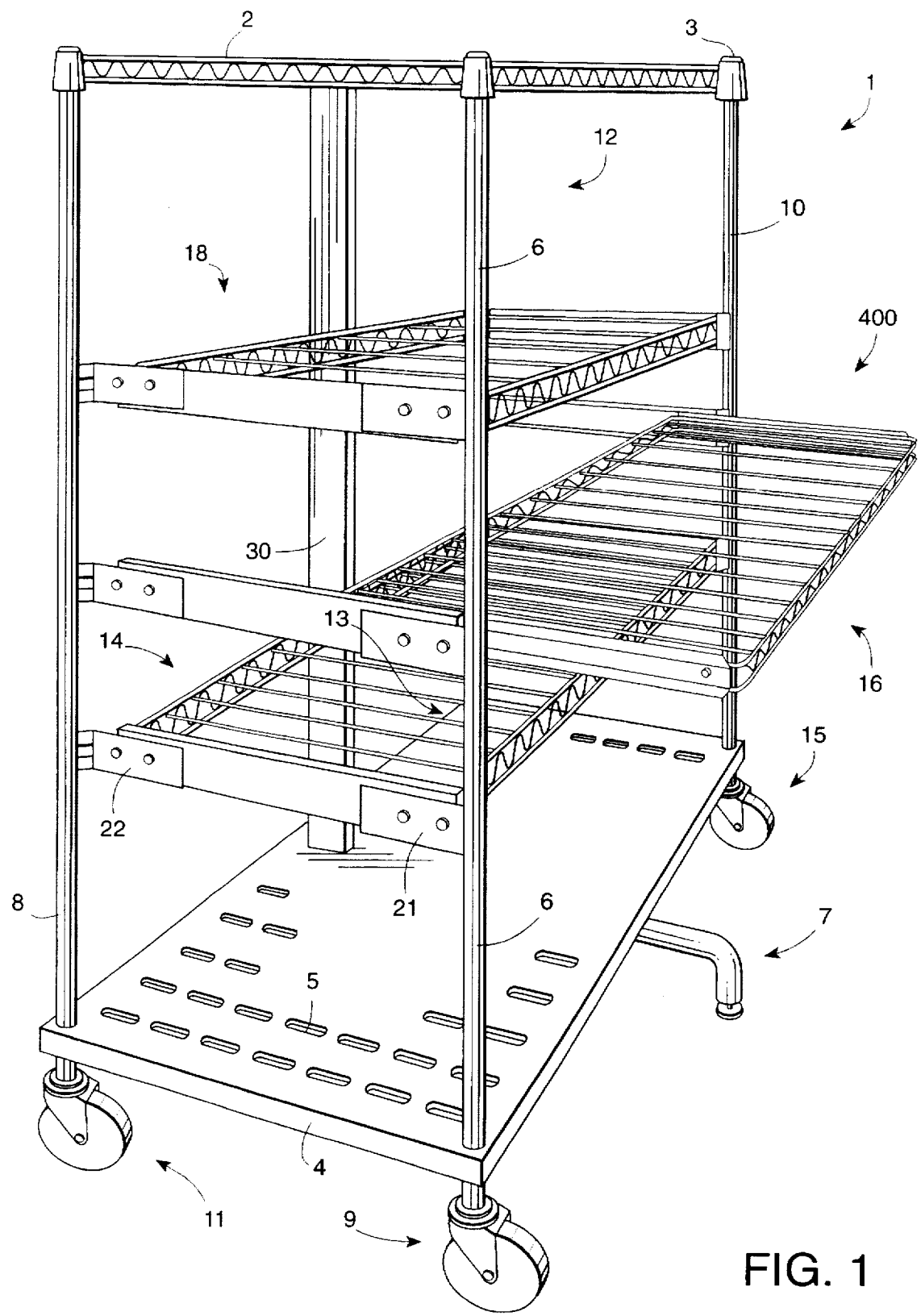
FIG. 1 is a fragmented, perspective view of an assembled modular storage system with fixed- and active-level storage units according to a preferred embodiment of the present invention.

FIG. 1 illustrates one preferred embodiment of the storage system 1 according to the present invention. Typically, such a storage system comprises a fixed top assembly, shown as a fixed top shelf assembly 2, and a fixed base assembly, shown as a fixed base shelf assembly 4, secured to a plurality of generally cylindrical, hollow support posts 6, 8, 10, and 12.

The fixed top shelf assembly 2 may be a substantially rectangular platform in the form of a wire rod shelf comprising four side members secured to collars at each corner and a wire rod mat assembly secured thereto as an article-supporting platform. In one example, the side members and the mat assembly are formed from No. 6 American Wire Gauge (A.W.G.) B.B.S. wire.

It will be understood that the fixed top assembly may simply comprise the side members and the collars.

The fixed base shelf assembly 4 may be a substantially rectangular, thermoplastically fabricated platform with a collar portion integrally formed at each corner. Of course, the fixed base shelf assembly alternatively may be made from any suitable metal material, such as sheet metal, aluminum, and the like, with collars secured by well-known techniques. Optionally, a plurality of openings 5 may be formed in the fixed base shelf assembly 4 to allow liquids and air to pass therethrough and to otherwise reduce material costs and weight. One structure suitable for use as the base shelf assembly is disclosed in U.S. Pat. No. 3,874,511 (Maslow), also marketed by InterMetro Industries Corporation. U.S. Pat. No. 3,874,511 is hereby incorporated by reference.

It will also be understood that the fixed base assembly may be in the same form as the fixed top assembly and fixed top shelf assembly described above. Likewise, the fixed top shelf of the storage system may be constructed in the manner of the fixed base assembly. Further, the fixed top assembly and the fixed base assembly may be of mutually similar or differing constructions.

The fixed top shelf assembly 2 and the fixed base shelf assembly 4 may be secured to the posts 6, 8, 10, and 12 using the collar and split-sleeve hardware in the manner of the previously discussed SUPER ERECTA SHELF® shelving system such as disclosed in previously discussed U.S. Pat. Nos. 3,424,111 and 3,523,508, which are also hereby incorporated by reference.

Storage system 1 may include one or more of substantially rectangular fixed- and/or active-level storage units, shown as active-level shelf assemblies, disposed between the fixed top shelf assembly 2 and the fixed base shelf assembly 4. However, for purposes of illustration, only three active-level shelf assemblies, 14, 16, and 18, are shown in FIG. 1. Although the active-level storage units are depicted between the top shelf assembly 2 and the base shelf assembly 4, they may be positioned outwardly from one or both such shelf assemblies.

It will be understood that the active-level shelf assemblies may be in the form of a variety of different storage units per se, a bin, a tray, or the like. However, for simplicity of illustration, they are generally referred to herein as active-level shelf assemblies. Of course, the claims are not to be limited to shelves or shelf assemblies per se.

The active-level shelf assemblies 14, 16, and 18 are secured to support posts 6, 8, 10, and 12 by means of heavy-duty slides, one of which is depicted by reference numeral 400.

An optional anti-tip assembly 7, which will be discussed below in detail, may be provided to increase the stability of the shelving system 1. A strut 30, secured between the fixed top shelf assembly 2 and the fixed base shelf assembly 4, cooperates with the anti-tip assembly 7 and otherwise adds rigidity to storage system 1. In FIG. 1, the anti-tip assembly is secured to the bottom surface of the fixed base assembly. It may also be secured to the top surface of the fixed based assembly as will be discussed herein. Moreover, the anti-tip assembly may comprise a leg which is stationary relative to the fixed base assembly or relatively movable with respect to the fixed base assembly.

If desired, casters 9, 11, 13 (not shown in FIG. 1), and 15 may be inserted into support posts 6, 8, 10, and 12, respectively, to allow the storage system 1 to be readily moved. Alternatively, adjustable feet (not shown in FIG. 1) may be inserted into the bottom of the support posts.

In addition, end plugs, one of which is shown by reference numeral 3, optionally may be inserted into a hollow end section of the support posts.

Typically, casters, post feet, and end plugs are factory-installed in the ends of the support posts.

Figure 2A:
FIG. 2A is a top view of front mounting bracket with an angled engagement portion for supporting an active-level storage unit in the storage system shown in FIG. 1.
Figure 2B:
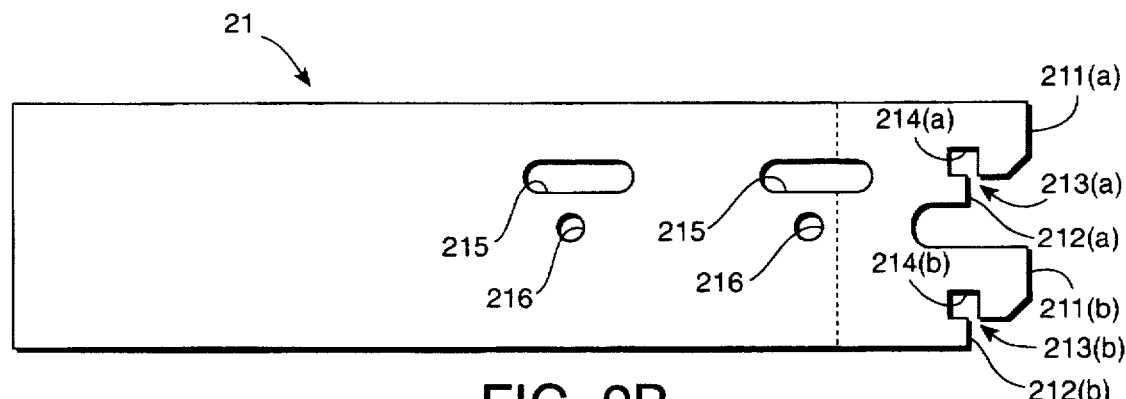
FIG. 2B is a front elevation view of the mounting bracket shown in FIG. 2A.

FIGS. 2A and 2B show a front mounting bracket 21. One end of the front mounting bracket 21 includes a pair of hook-shaped tabs, i.e., hook tabs 211(a) and 211(b).

The hook tabs are sized so as to fit into a pair of vertically adjacent slots formed in the support posts or slotted-post inserts as will be discussed later herein.

Vertical stop portions 212(a) and 212(b) are provided beneath each of hook tabs 211(a) and 211(b) for abutting a wall portion of a support post or a slotted-post insert present between a pair of vertically adjacent slots formed in the support posts or the slotted-post inserts to be described later. The pair of hook tabs 211(a) and 211(b) are inserted into the pair of vertically adjacent slots until stop portions 212(a) and 212(b) restrict further inward movement of the front mounting bracket 21 by abutting the wall portion of the support post or the slotted-post insert. Locking channels 213(a) and 213(b) are provided for positioning and securing the front mounting bracket 21 to a support post or slotted-post insert as will be discussed later herein. The locking channels 213(a) and 213(b) are sized to be slightly wider than a thickness of the material from which the support posts or the slotted-post inserts are fabricated.

A plurality of elongated apertures 215 and circular holes 216 are provided to facilitate positioning and mounting of front mounting bracket 21 to other storage system hardware.

As shown in FIG. 2A, front mounting bracket 21 is bent at an approximately 45° angle near an edge portion of the same.

Figure 2C:
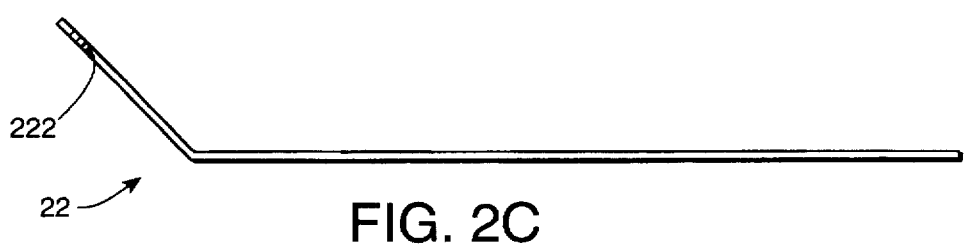
FIG. 2C is a top view of a rear mounting bracket with an angled engagement portion for supporting an active-level shelf in the storage system shown in FIG. 1.
Figure 2D:
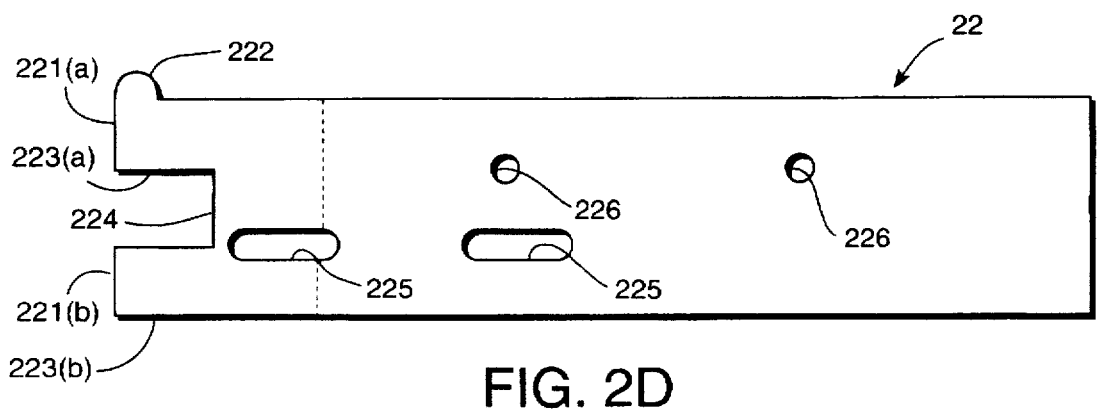
FIG. 2D is a front elevation view of the mounting bracket shown in FIG. 2C.

FIGS. 2C and 2D show a rear mounting bracket 22. One end of the rear mounting bracket 22 includes a pair of straight tabs 221(a) and 221(b). The straight tabs are also sized so as to fit into a pair of vertically adjacent slots formed in the support posts or the slotted-post inserts as will be discussed later herein.

A vertical stop portion 224 is provided between straight tabs 221(a) and 221(b) for abutting a wall portion of a support post or a slotted-post insert between a pair of vertically adjacent slots formed in the support posts or the slotted-post inserts. The pair of straight tabs 221(a) and 221(b) is inserted in the pair of vertically adjacent slots until stop portion 224 restricts further inward movement of rear mounting bracket 22 by abutting the wall portion of the support post or the slotted-post insert.

A projecting portion 222 on tab 221(a) serves to prevent the rear mounting bracket 22 from sliding straight out of a slot after it is inserted into the support post or the slotted-post insert.

A plurality of elongated apertures 225 and circular holes 226 are provided to facilitate mounting of rear mounting bracket 22 to other storage system hardware.

As shown in FIG. 2C, rear mounting bracket 22 is bent at an approximately 45° degree angle near an edge portion of the same.

As will be discussed in detail later in connection with FIGS. 4A through 4C, the front mounting bracket is secured to one end of a mounting member 401 of slide assembly 400, and the rear mounting bracket is secured to an opposing end of mounting member 401 of slide assembly 400. The mounting brackets may be secured to the mounting member 401 by means of machine screws, nuts and bolts, rivets, welding, brazing, and the like.

Although one embodiment of the invention contemplates the use of separate front end and rear end mounting brackets, an integral bracket having front end and rear end or edge portions shaped in the same manner as the front and rear mounting brackets, respectively, is contemplated. Individual brackets have the advantage that each can be mounted to a slide assembly at a desired position independently of the other. This allows the use of one-sized slide for a variety of storage systems having different distances between the front and rear support posts. An integral bracket does not have the above-described advantage but may lend additional strength and rigidity to the storage system.

Although pairs of straight tabs and mounting tabs at an end or edge portion of two mounting brackets have been discussed in connection with one embodiment of the invention, it is contemplated that a single tab or more than two tabs may be used at an end or edge portion of a mounting bracket. Moreover, the number of tabs used at one side and/or end or edge portion of the storage system may differ from the number of tab(s) used at an opposing side and/or end or edge portion.

Figure 3:
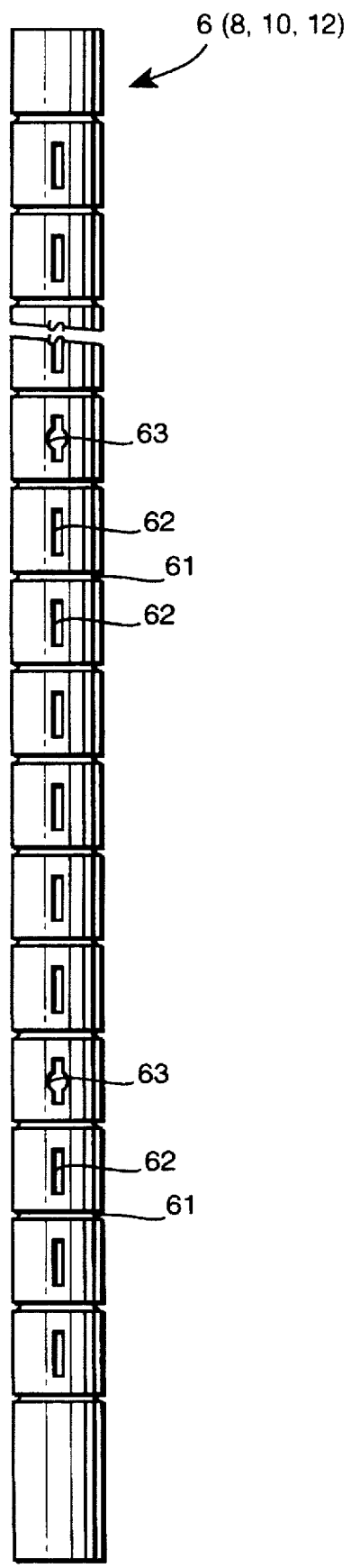
FIG. 3 is a fragmented elevation view of one embodiment of a support post used in the storage system shown in FIG. 1.

FIG. 3 shows a fragmented elevation view of one embodiment of the support post 6. As noted generally above, a plurality of circumferential grooves 61, spaced apart at substantially regular intervals, are formed on the exterior surface of support post 6. The grooves are provided to receive the ribs formed on an inside surface of a supporting frustoconical sleeve, such as that described in U.S. Pat. No. 3,523,508 (Maslow) and previously mentioned U.S. Pat. No. 3,757,705 (Maslow), which also are incorporated herein by reference.

In addition, a vertical array of elongated mounting bracket tab slots 62 are formed in the support post 6 at regular intervals. Periodically, the tab slots are provided with arcuate center portions 63 that constitutes a distinguishing detail to aid in visually locating like-positioned tab slots in the supporting post 6 for convenience. Otherwise, the arcuate portions 63 are generally cosmetic and are not necessary to the construction of the invention. Tab slots 62 cooperate with the mounting brackets to support one or more intermediate shelves in the storage system.

Of course, the support posts may be of other cross sections, such as square or rectangular shapes. Further, the support posts need not be hollow throughout but may be hollow only in those sections which are to receive a member inserted into two openings of these sections.

The support post shown in FIG. 3 is generally cylindrical and hollow throughout and is typically nickel-chrome plated; decoratively coated, cold-rolled steel; or a stainless steel sheet. These compositions are relatively lightweight, provide high structural rigidity, and are inexpensive to manufacture by known metal-forming methods. Further, these materials are resistant to corrosion and are easily cleaned. Still further, the grooves 61 and the tab slots 62 may be efficiently formed therein, using known metal-working methods.

Alternatively, the support posts may be made of any conventional material, which can be formed to define the above features, particularly including materials such as plastics. Such alternative materials may be well suited to particular storage system applications.

Support posts 8, 10, and 12 may be fabricated in the same manner as exemplary support post 6 and need not be discussed in detail.

Figure 4A:
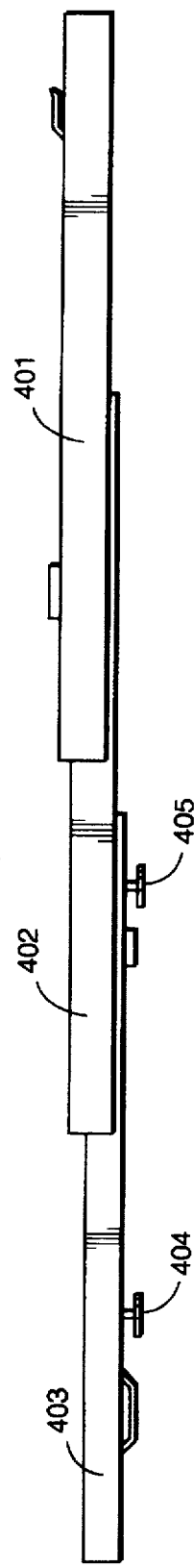
FIG. 4A is a top view of an extended slide assembly for mounting an active-level storage unit to the storage system shown in FIG. 1.
Figure 4B:
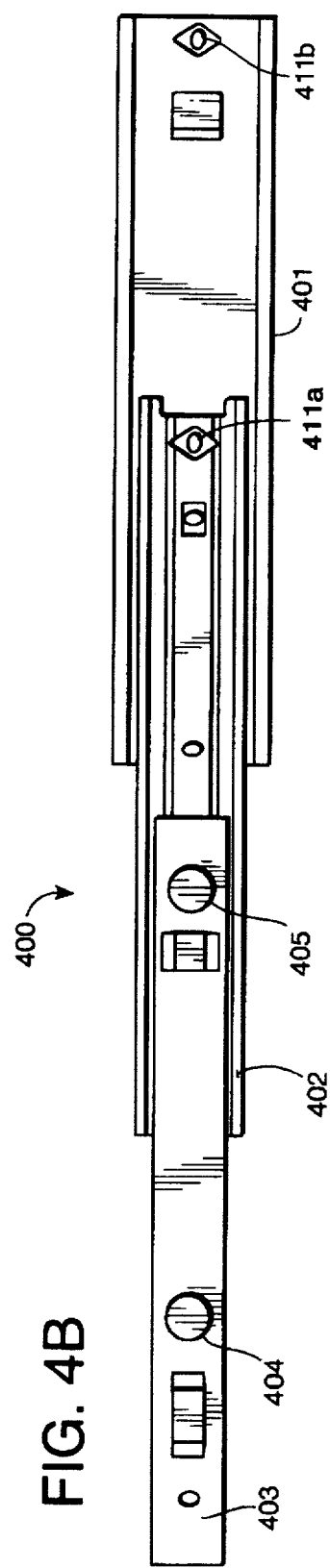
FIG. 4B is a side elevation view of the extended slide assembly shown in FIG. 4A.
Figure 4C:
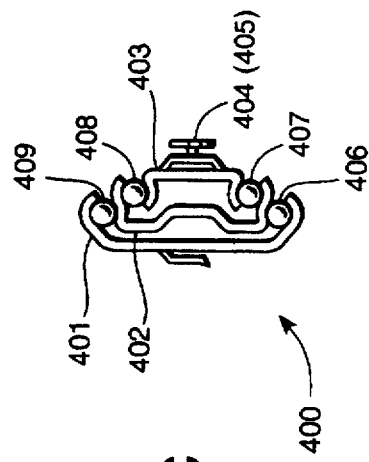
FIG. 4C is an end view of the slide assembly shown in FIGS. 4A and 4B.

FIGS. 4A through 4C show the slide assembly 400 suitable for mounting an active-level shelf assembly to the storage system of FIG. 1.

A variety of slide assemblies may be used, such as the ACCURIDE® Model 3620 slide, which is suitable to support up to a 200 pound load capacity. Each such slide assembly 400 comprises three main interrelated and cooperating subassemblies, i.e., the storage system mounting member 401, an intermediate slide travel member 402, and a shelf slide/slide mounting member 403.

The relative movement of the several subassemblies' slide members comprising the slide assembly 400 is facilitated by steel ball bearings, four of which are depicted by reference numerals 406 through 409.

Two detent bumpers 411a and 411b cooperate to limit the inward travel of the shelf slide/slide mounting member 403 to avoid damage to the active-level shelf assembly mounted thereon and other components of the storage system.

A pair of shoulder rivets 404, 405 and the like are secured to shelf slide/slide mounting member 403 for engagement with suitably spaced apertures in an active-level shelf assembly component as will be discussed hereinbelow. Although a pair of shoulder rivets are shown, the invention contemplates additional rivets if increased support is desired. Of course, the shelf slide/slide mounting member 403 may be secured to an active-level shelf assembly component using other fasteners or may be permanently secured to an active-level shelf assembly component by known techniques, such as welding, brazing, and the like.

Each slide 400 assembly may be secured to a pair of mounting brackets 21, 22 by means of fasteners, such as rivets or threaded fasteners. Alternatively, each slide assembly 400 can be secured to the mounting brackets 21, 22 by welding, brazing, and the like. As noted previously, each pair of mounting brackets includes a front mounting bracket 21 and a rear mounting bracket 22. Alternatively, an integral mounting bracket may be used as discussed above.

Use of slide assemblies on both sides of an active-level shelf assembly, mounted at the same height as the storage system, ensures a securely supported, smoothly operating active-level shelf assembly.

The ACCURIDE® slide feature stops, detents, bayonets and bayonet pockets to facilitate its operation and installation. The slides also feature silenced in and out positive stops. A variety of slide travel dimensions are available. The three slide member subassemblies are finished with electro-zinc plating.

Figure 5A:
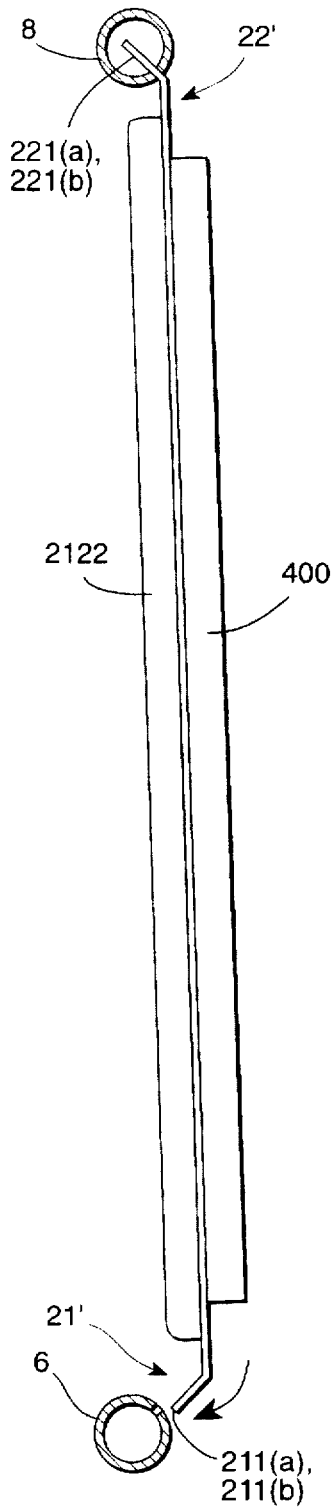
FIGS. 5A through 5C are schematic drawings illustrating the installation of the slide assembly shown in FIGS. 4A, 4B, and 4C to the support post shown in FIG. 3.
Figure 5B:
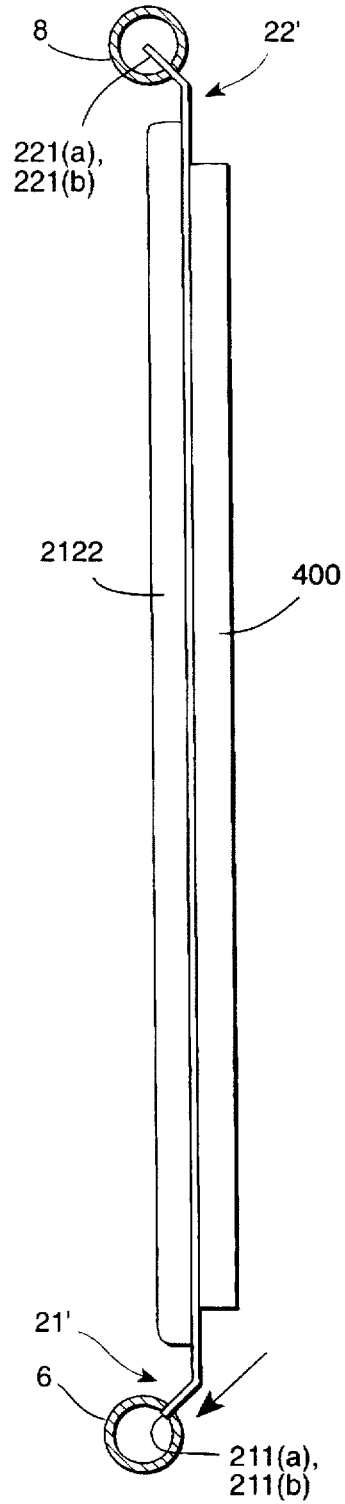
Figure 5C:
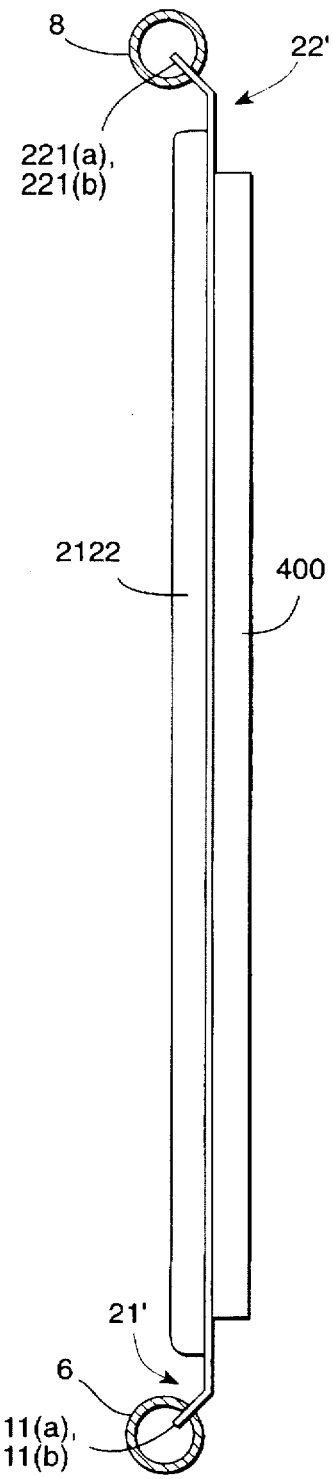

FIGS. 5A through 5C schematically illustrate the installation of an integral mounting bracket 2122 in the storage system 1 between support posts 6 and 8. For simplicity of illustration, slide assembly 400 is shown schematically, i.e., without the details illustrated in FIGS. 4A through 4C. The slide assembly 400 is secured to the integral mounting bracket 2122. Ordinarily, a slide assembly is secured either to the pair of support mounting brackets 21, 22 or to the integral mounting bracket 2122 prior to installation in storage system 1.

Straight tabs 221(a) and 221(b) of a rear mounting bracket portion 22' are inserted into two mounting tab slots (not shown) formed in the rear support post 8 at the desired height. Because tab 221(a) includes a projection 222, the rear mounting bracket must initially be inserted at a vertical angle to the support post 8 to provide clearance for the tab to enter the tab slot. This is achieved by simply raising the front of the slide assembly relative to the rear of the slide assembly. The mounting bracket is then positioned substantially perpendicular to the support posts. The mounting bracket is then urged toward the rear support post 8, causing the tabs to be pushed into the tab slots until travel is restricted. Then a front bracket portion 21' is rotated horizontally toward two tab slots (not shown) formed in front support post 6 at a height matching that of the tab slots in back support post 8. The hook tabs 211(a) and 211(b) of mounting bracket 21 are inserted into the two tab slots of front support post 6. The hook tabs 211(a) and 211(b) are urged down to lock bracket 21 to support post 6. The sizing of channels 213(a) and 213(b) is selected to ensure a snug fit.

It will be readily understood that integral mounting bracket 2122 or the pair of mounting brackets 21, 22 is secured to slide assembly 400 such that the slide assembly 400 is removably mounted substantially perpendicular to the support posts.

Figure 6A:
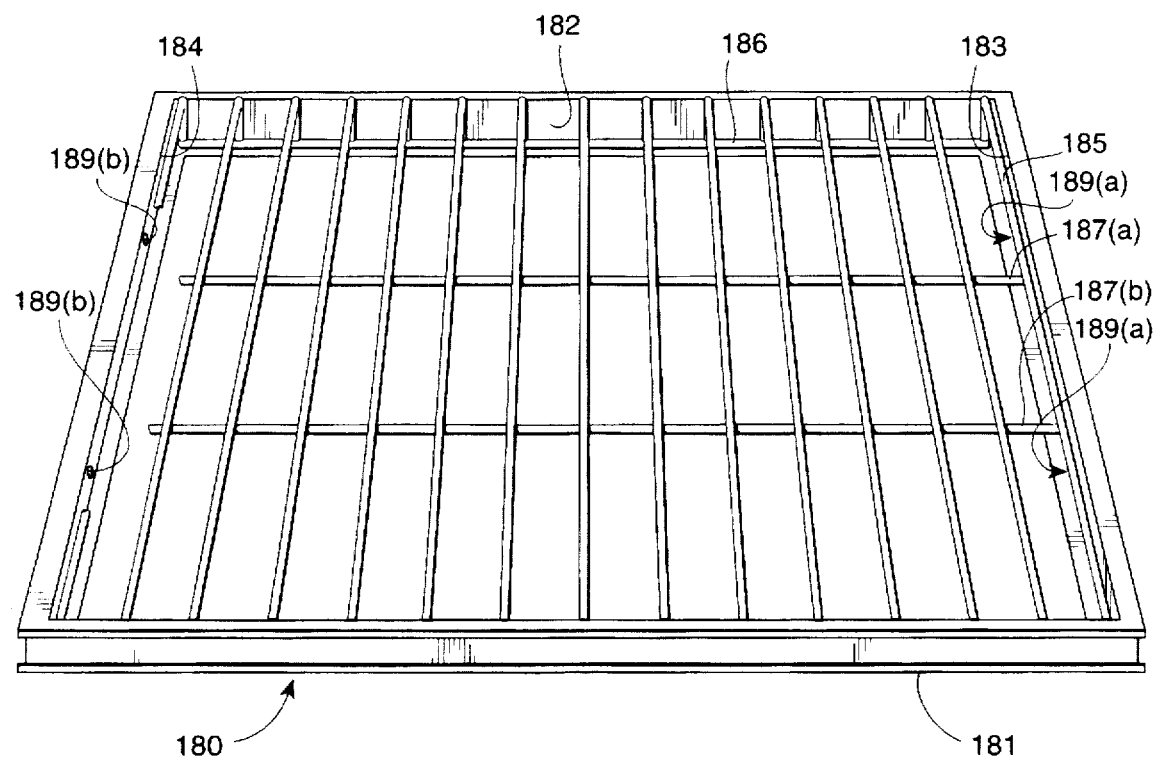
FIG. 6A is a perspective view of a first preferred embodiment of an active-level storage unit showing details of a frame assembly and a wire rod mat assembly installed in a first orientation.
Figure 6B:
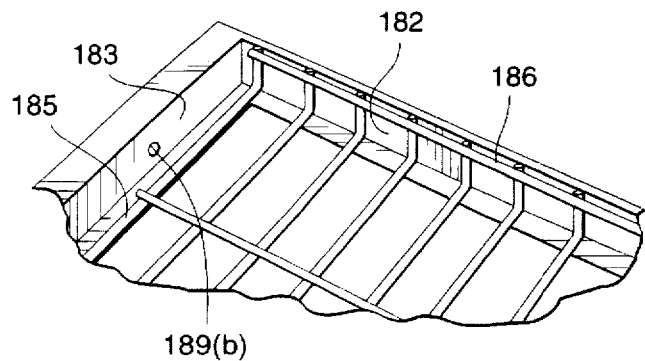
FIG. 6B is a fragmented, perspective view of the active-level shelf showing details of a frame assembly and a wire rod mat assembly installed in a second orientation different from that shown in FIG. 6A.
Figure 6C:
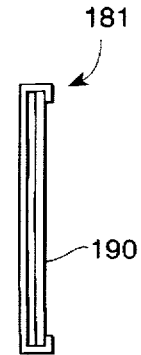
FIG. 6C is a side view of a detail of the active-level storage unit shown in FIGS. 6A and 6B.

FIGS. 6A through 6C show a first embodiment of an active-level shelf assembly 180 including a substantially rectangular frame assembly and a removable substantially rectangular wire rod mat assembly.

The frame assembly includes a front frame member 181, a rear frame member 182, and a pair of side frame members 183, 184. The frame members are L-shaped such that each constitutes a side wall portion and a lip portion. When the frame assembly is formed, the lip portions are substantially coplanar and extend substantially horizontally around the inside perimeter of the frame assembly.

A pair of horizontally oriented, keyhole-shaped openings 189(a) and 189(b) are formed on side frame members 183 and 184, respectively. The openings 189(a) and 189(b) serve to support an active-level shelf assembly.

The mat assembly is formed by bending each end of wire platform rods 185, which are connected at their ends to terminal rods 186, at both the front and rear of the mat assembly. Support rods 187(a) and 187(b) are centrally located between the terminal rods 186 and are generally disposed substantially perpendicularly to the platform rods 185. All wire rods are secured where they intersect each other by welding, brazing, and the like.

In the embodiment shown in FIG. 6A, the mat assembly is inserted in the frame assembly such that the bent ends of the wire rods are directed downwardly in normal use. With the mat assembly so oriented, terminal rods 186 are supported on the lip portions of front frame member 181 and the lip portion of rear frame member 182. In addition, the ends of the outermost wire rod 185 on each side of the wire rod mat assembly is supported by a lip portion of proximate side 183.

In the embodiment shown in FIG. 6B, the mat assembly is inverted such that the bent ends of wire rods 185 curve in an upward direction such that terminal rods 186 are substantially coplanar with the top edge of frame members 181 through 184.

FIG. 6C shows a side view of front frame member 181 wherein its elongated C-shape is visible. A label or trim piece 190 may be inserted in the space defined by the C-shape to provide information or decorative effect.

Again with reference to FIGS. 4A through 4C, the active-level shelf assembly 180 is positioned so that the shoulder rivets 404 and 405 at the rear of the shelf slide/slide mounting member 403 are proximate to a pair of keyholes 189(a) on one of the shelf assembly and a pair of keyholes 189(b) on an opposing side of the shelf assembly. The active-level shelf assembly 180 is secured to the shelf slide/slide mounting member 403 such that a pair of shoulder rivets is inserted into a large portion of each of the keyholes at the rear of the storage system, and the pair of shoulder rivets is inserted into the large portions of each of the keyholes at the front of the storage system. When all four shoulder rivets are inserted in the four keyholes, the shelf assembly is urged back so that a neck portion of the shoulder rivets slides into the narrow portions of the keyholes. The shelf assembly may be held in place by a friction fit with the keyholes or with set screws (not shown).

Figure 7:
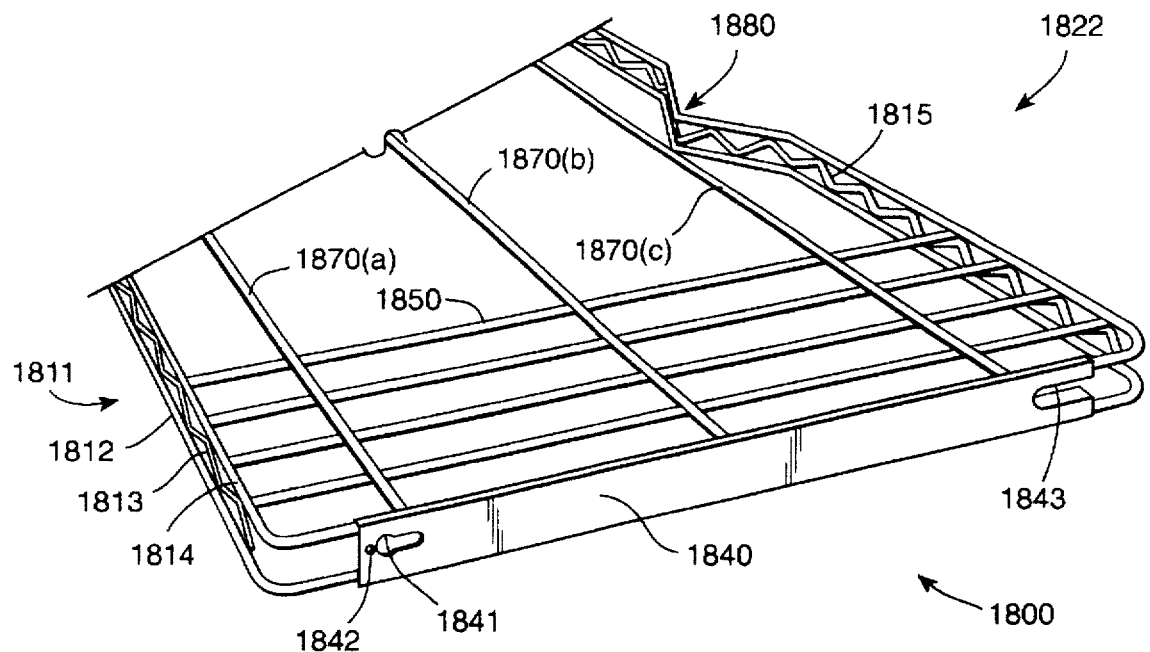
FIG. 7 is a fragmented perspective view of a second preferred embodiment of an active-level storage unit showing details of a frame assembly and a wire rod mat assembly.

FIG. 7 shows another preferred embodiment of an active-level shelf assembly 1800 including a substantially rectangular wire rod frame assembly and a wire rod mat assembly.

The frame assembly is formed by bending lower wire frame rail 1812 into a substantially rectangular frame.

The ends of the wire rod forming the frame element may be welded together where they meet to form a continuous frame rail. An upper wire frame rail 1814 is formed in like fashion. The lower and upper wire frame rails 1812, 1814 are connected at a front side 1811 by means of a snake-like rib 1813, which is welded where it comes into contact therewith. A similar arrangement is used to connect the opposing back side 1822, where a snake-like rib 1815 is welded to the lower and upper frame rails.

An array of wire platform rods, one of which is depicted by reference numeral 1850, extends from the front to the back of the active-level shelf assembly. A plurality of support rods 1870(a), 1870(b), and 1870(c) extends from one side to the other side of the active-level shelf assembly 1800 substantially perpendicular to platform rods 1850. Support rods 1870(a), 1870(b), and 1870(c) are secured to the underside of upper wire frame rail 1814 and platform rods 1850 by welding, brazing, or the like. Platform rods 1850 are welded, brazed, or the like where they intersect the top surface of support rods 1870(a), 1870(b), and 1870(c) and where they intersect the bottom of upper frame rail 1814.

The back side of the frame 1822 includes a V-shaped, indented portion 1880 to accommodate a component of the storage system 1, such as an intermediate connecting post for receiving a back panel, each connected on one or both sides of said intermediate post at one edge and to a rectangular corner at an opposing edge. This arrangement provides for a more enclosed system. The intermediate connecting post may be of the same structure as the support posts, but it need not be of the same length as the support posts.

A support panel 1840 is secured to each side of the active-level shelf assembly 1800. The panel may be welded, brazed, or the like to the lower and upper wire frame rails 1812, 1814. Alternatively, support panel 1840 may be formed to have hook-shaped ends for resiliently snapping-over and engaging the lower and upper wire frame rails 1812, 1814.

Each support panel 1840 includes a horizontally oriented keyhole 1841 at one end and an elongated slot 1843 at an opposing end for engaging the shoulder rivets on the shelf slide/slide mounting member 403.

Again with reference to FIGS. 4A through 4C, the active-level shelf 1800 is positioned so that the shoulder rivet 405 at each side of the rear of the shelf slide/slide mounting member 403 is proximate to the open end of slot 1843. The active-level shelf assembly is urged toward the rear of the storage system so that the shoulder rivet 405 on each side slides partially into a respective slot 1843. The shoulder rivet 404 at the front of the shelving system is positioned in the larger part of keyhole 1841, while the rear shoulder rivets 405 are still within their respective slots 1843. The active-level shelf assembly is then pulled forward slightly so that the front shoulder rivet 404 enters the narrow portion of keyhole 1841. The shelf assembly may be secured to the slide assembly 400 by a large head fastener, such as a machine screw (not shown) threaded into a hole 1842 to prevent the front shoulder rivets from sliding toward the large portion of the keyhole 1841, slipping out of keyholes 1841 and slots 1843, and allowing the active-level shelf assembly to be dislodged from the shelf slide/slide mounting member 403.

The active-level shelf 1800 may also be inverted and secured to the slide assembly 400 to form a bin or a tray.

Figure 8A:
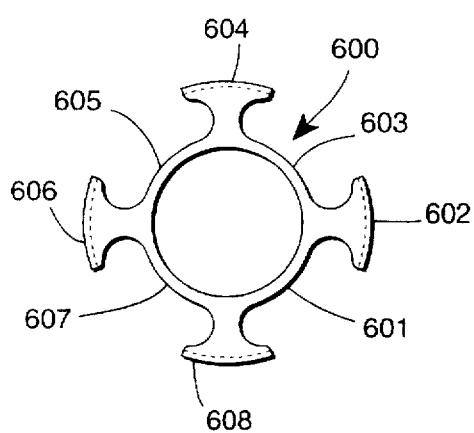
FIG. 8A is a top view of a support post according to a second embodiment of the invention.
Figure 8C:
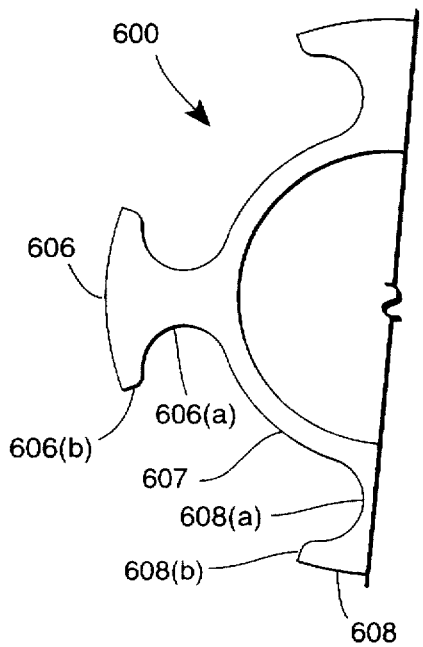
FIG. 8C is a fragmented, enlarged top view of the details of the support post shown in FIGS. 8A and 8B.
Figure 8B:
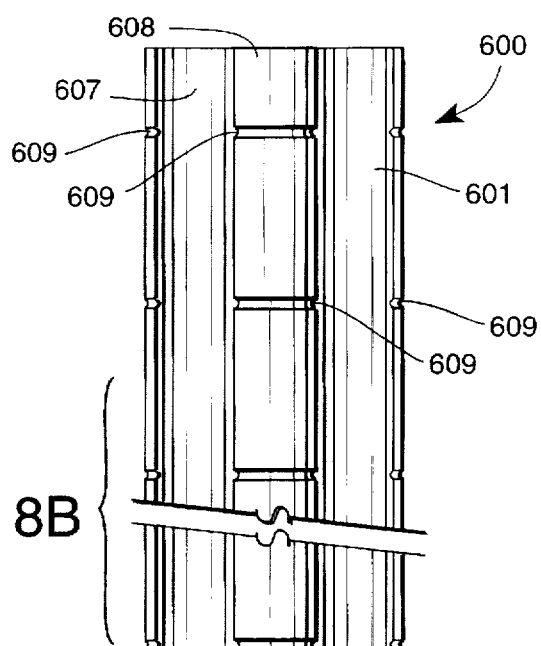
FIG. 8B is a fragmented elevation view of the support post shown in FIG. 8A.

FIGS. 8A through 8C show another embodiment of a support post suitable for use with the storage system. Support post 600 features an interior post with four slots 601, 603, 605, and 607, formed on an outer cylindrical surface of the post between pairs of integrally formed, radially extending flanges or dovetails 602, 604, 606, and 608.

The interior of support post 600 is preferably tubular in shape, with a circular cross section having interior and exterior concentric wall surfaces. The flanges preferably extend the entire longitudinal length of the support post.

As best seen in FIG. 8A, the flanges 602, 604, 606, and 608 are spaced equidistantly from each other around the periphery of the support post. Thus, the four flanges are spaced at 90° intervals from each other, defining the four longitudinal slots 601, 603, 605, and 607 therebetween. Although using four flanges defining four longitudinal slots may be preferred because of the versatility of such an arrangement, the number of flanges and slots is arbitrary and can vary without departing from the scope of the invention. In fact, in its simplest form, the support post can function with a single longitudinal slot. A single slot may be formed merely by longitudinally indenting the support post with the desired cross-sectional shape.

Each flange has a first portion which extends radially from the interior post. At the terminal end of the first portion is an arcuate second portion resulting in an overall arcuate T-shaped flange. The surfaces of the second portions define a circumference that is concentric with the interior and exterior wall surfaces of the interior post structure.

More specifically, with further reference to FIG. 8C, each slot is shaped to have side surfaces 606(*a*) and 608(*a*) formed on a first portion of a pair of the flanges 606 and 608, respectively. Each flange also has an inwardly disposed lip portion 606(*b*) and 608(*b*), respectively, contiguous with arcuate portion 606(*c*) and 608(*c*). The shape of the flanges is such that any pair of opposing flanges defines a partially enclosed, arcuate, T-shaped slot 607 therebetween. This four-sided slot is simple in design but provides maximum versatility for use with other storage systems. As will be discussed later, the support slots 601, 603, 605, and 607 are sized and shaped to receive a slotted-post insert, each having an array of vertical slots formed therein for receiving mounting brackets. The slots in the slotted-post insert are used to receive offset mounting brackets, discussed later in connection with FIGS. 10A through 10C, which are secured to the slide assemblies 400.

A plurality of circumferential grooves, two of which are depicted by reference numeral 609, are formed on the outer surface of the slotted support post 600, i.e., on the arcuate, outwardly disposed surfaces of flanges 602, 604, 606, and 608. The grooves are typically spaced approximately 1½ apart substantially along the length of support post 600. Each groove 609 may be used to support shelves using the previously discussed collar and sleeve arrangement.

Support posts 600 may be made from a variety of materials, such as 6063-T5 extruded aluminum, using known techniques, such as extrusion. Alternatively, support posts 600 may be protruded. Support posts 600 may be shaped and sized as needed, but a support post having a 1.625" O.D. with a 0.870" I.D. has shown to be effective for its intended use.

Figure 9A:
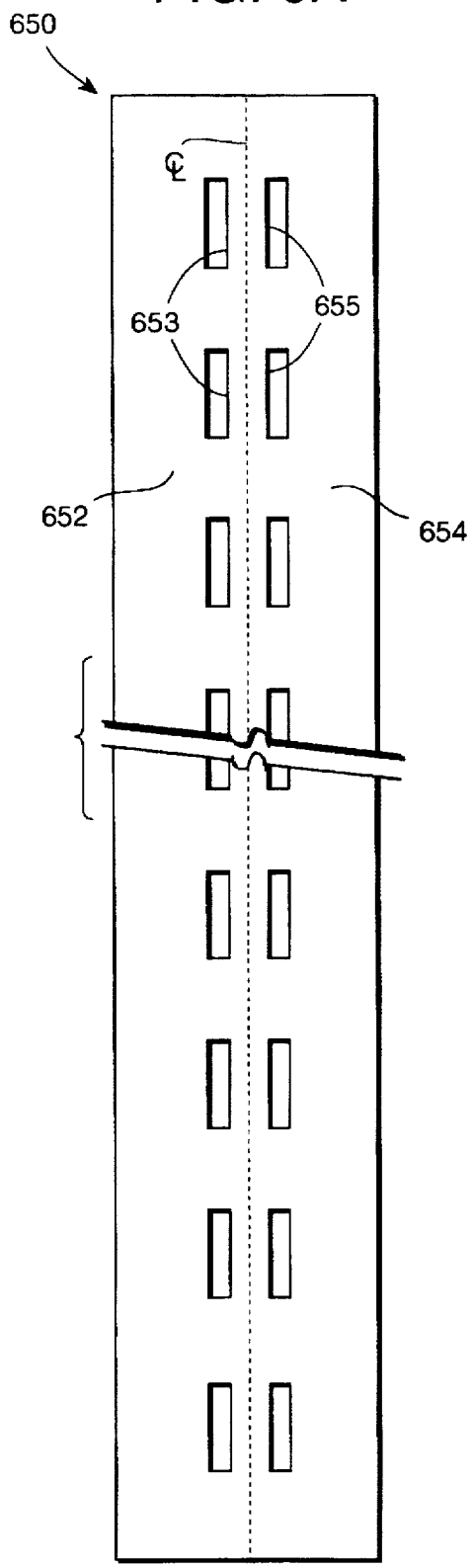
FIG. 9A is a plan view of a slotted-post insert blank to be formed for use with the support post shown in FIGS. 8A through 8C.
Figure 9B:
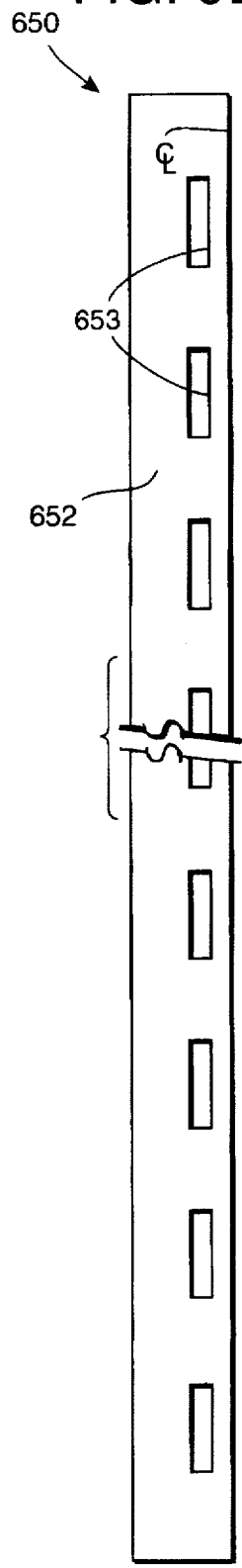
FIG. 9B is side elevation view of a slotted-post insert according to a first embodiment of the invention formed from the blank shown in FIG. 9A for use with the support post shown in FIGS. 8A through 8C.
Figure 9C:
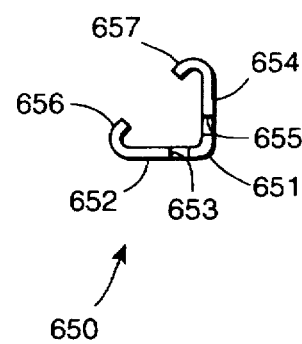
FIG. 9C is an end view of a slotted-post insert shown in FIG. 9B for use with the support post shown in FIGS. 8A through 8C.

FIGS. 9A through 9C show a first embodiment of a slotted-post insert 650 designed for use with slotted support post 600.

To better understand the fabrication and configuration of slotted-post insert 650, FIG. 9A is a view of a section of the blank material from which the slotted-post insert is formed. An array of slots 653 and 655 is formed in and extends in two columns substantially along the entire length of the blank material. Of course, a single column of slots may suffice for certain applications. The blank material from which the slot-post insert is made is typically 16-gauge, i.e., 0.060", cold-rolled steel. The slots may be formed by pressing, punching, stamping, or the like. The slots may be on the order of ⅛" in width and ½" in length.

With particular reference to FIGS. 9B and 9C, the blank is then bent about its longitudinal center-line $C_L$ using known metal-forming methods. This forms a substantially V-shaped apex portion 651 and a pair of substantially perpendicular, flat side portions 652 and 654. The array of vertical slots 653 and 655 are disposed on side portions 652 and 654, respectively, on either side of the V-shaped apex portion 651.

The blank is further formed by bending end portions 656 and 657 at terminating edges of flat portions 652 and 654 to extend inwardly, respectively.

To install the slotted-post insert 650 into support post 600, one end of the slotted-post insert is placed between a pair of opposing flanges at an end of the support post and pushed into position. The dimensions of the slotted-post insert and the partially enclosed slot are sized to ensure a snug fit between the slotted-post insert and the flanges.

Again, all burrs, chips, and sharp edges are removed from the slotted support post insert to ensure that these components will slide together smoothly into position in support post 600.

Figure 10A:
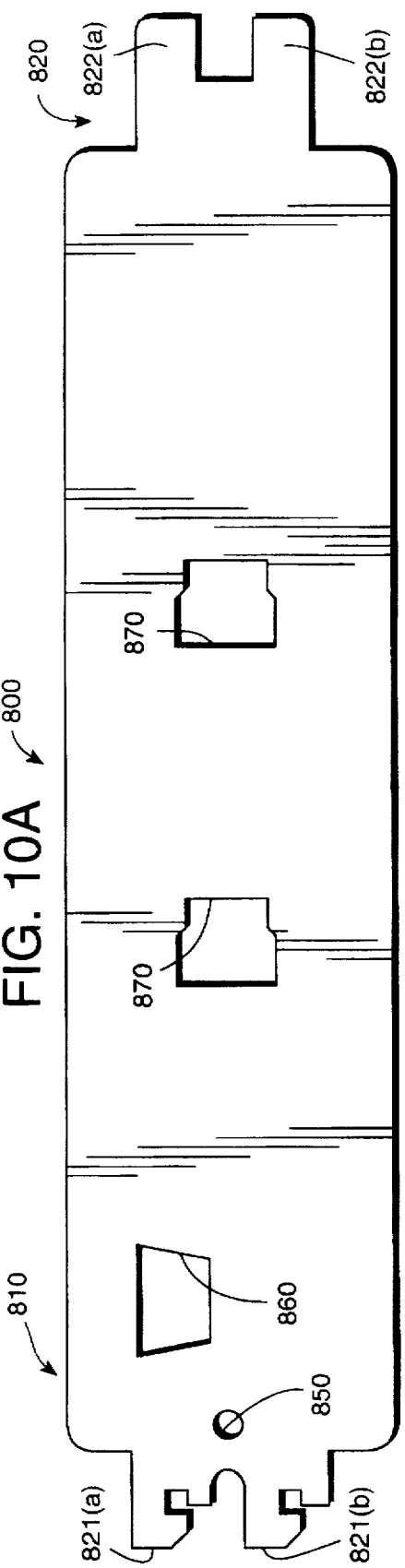
FIG. 10A is a plan view of an offset mounting bracket blank according to another embodiment of the invention for use with the support post of FIGS. 8A through 8C and the slotted-post insert shown in 9A through 9C.
Figure 10B:
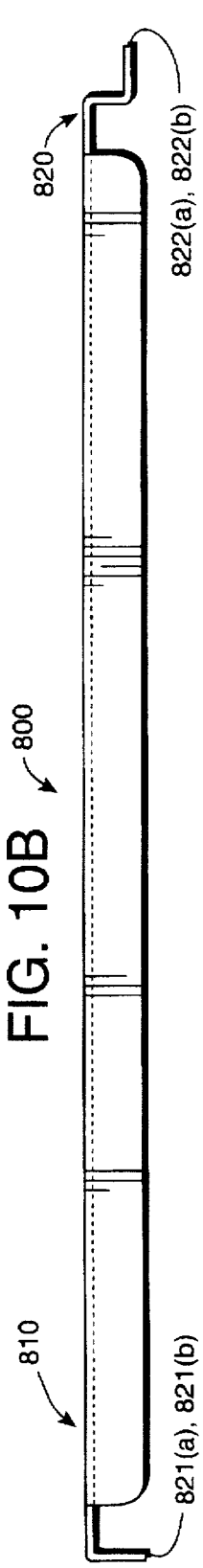
FIG. 10B is a top view of the mounting bracket formed from the blank shown in FIG. 10A.
Figure 10C:
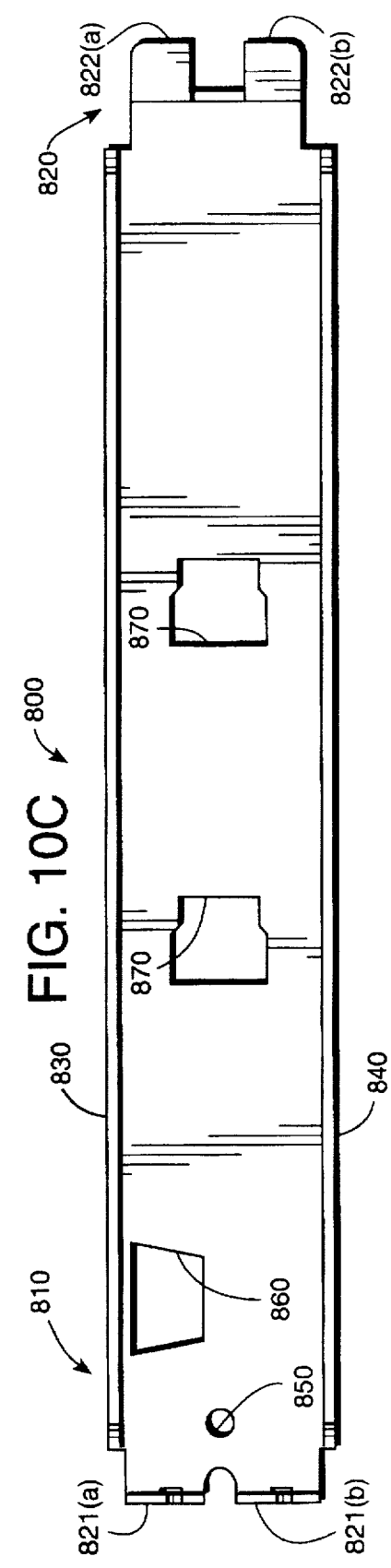
FIG. 10C is a side view of the mounting bracket shown in FIG. 10B.
Figure 12A:
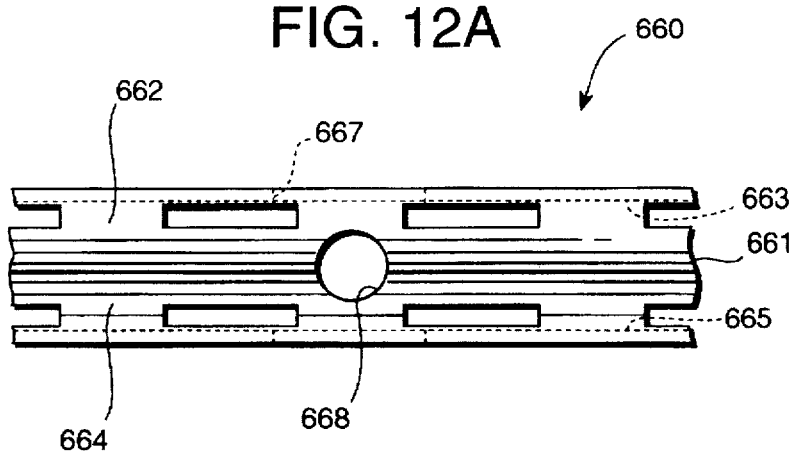
FIGS. 12A through 12D, respectively, are fragmented top, fragmented side, fragmented bottom, and end views of a slotted-post insert according to a another embodiment of the invention.
Figure 12D:
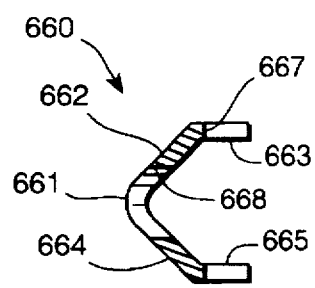
Figure 12B:
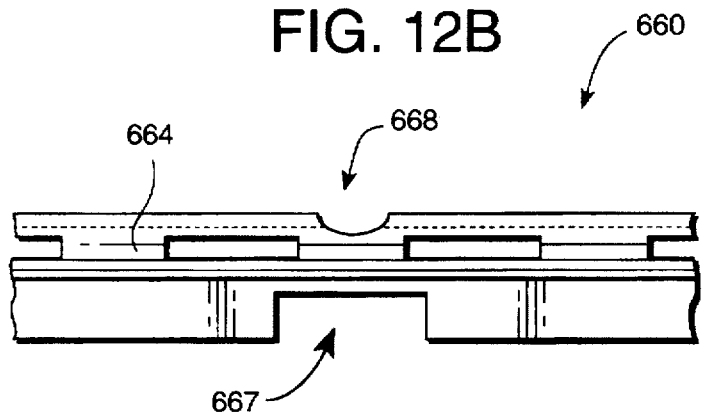
Figure 12C:
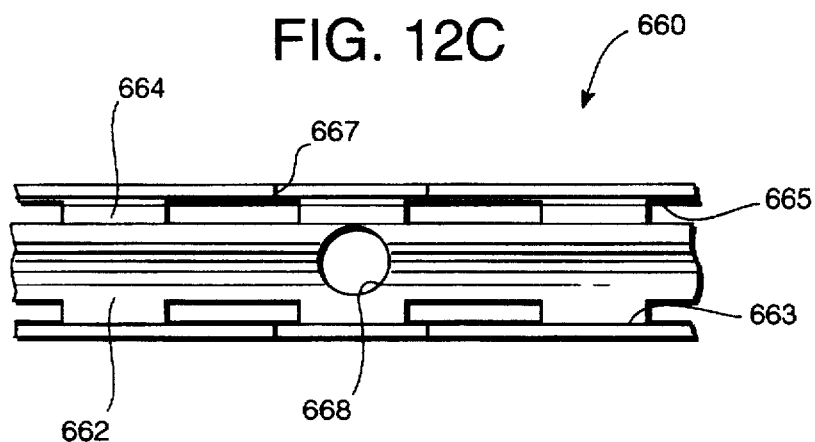

FIGS. 10A through 10C show another embodiment of a mounting bracket, which can be used with the support post 600 or slotted-post insert 650. More specifically, FIG. 10A shows a view of a blank, integral offset mounting bracket 800 having a front portion 810.

With reference to FIGS. 10B and 10c, the ends of front and rear portions of the mounting brackets are formed to have the same end or edge shapes, respectively, as front mounting bracket 21 and rear mounting bracket 22 discussed previously. However, with reference to FIG. 10B, mounting bracket 800 is further formed by bending the bracket near its end portions. According to one preferred embodiment, front end or edge portion 810 is bent at a right angle approximately ½" from its end such that tabs 821(*a*) and 821(*b*) are substantially perpendicular to the longitudinal axis of mounting bracket 800. Rear end or edge portion 820 is bent at a right angle ⅜" from its end and then bent again at a right angle ½" from its end, such that hook tabs 811(a) and 811(b) are parallel with the longitudinal axis of mounting bracket 800.

Mounting bracket 800 is further formed by bending a top portion 830 and a bottom portion 840 at a right angle to the transverse axis of the mounting bracket. Thus, what has been formed is a substantially C-shaped bracket having a simple right angle formed at one end and compound right angles formed at the opposite end.

A number of holes 850 and other apertures 860, 870 are provided for positioning and securing the mounting brackets to slide assembly 400 and otherwise for holding the mounting brackets for fabrication purposes.

It should be understood that the offset mounting bracket 800 is intended for use at the right-hand side of the storage system. A mirror-image-shaped offset mounting bracket must be used on the left-hand side of the storage system. Use of either two right-hand side or two left-hand side mounting brackets will not function to provide an active-level shelf assembly.

It will be appreciated that the offset mounting brackets 800 shown in FIGS. 10A through 10C are more compactly formed than the angled mounting brackets 21, 22 shown in FIGS. 2A through 2D. Accordingly, the offset mounting brackets provide more storage space compared to the angled mounting brackets.

FIG. 11A through 11C show an active-level shelf assembly removably supported by four slotted posts 606, 608, 610, and 612 in cooperation with a right-hand side offset mounting bracket 800 and slide assembly 400 and a left-hand side offset mounting bracket 800' and slide assembly 400'.

FIGS. 12A through 12D show a second embodiment of a slotted-post insert. This embodiment is substantially configured and formed in the same manner as the slotted-post insert shown in FIGS. 9A through 9C. However, this embodiment differs from the first embodiment in that it can be installed directly into a side of a slotted support post and need not be inserted into an end of the slotted support post.

Slotted-post insert 660 is generally configured to be substantially V-shaped having an apex portion 661 and a pair of substantially perpendicular, flat side portions 662 and 664, which in turn are bent to terminate, respectively, in substantially parallel side portion 663 and 665.

A circular through-hole 668 is provided in the V-shaped apex portion 661 for receiving a turning member as will be explained later. Typically, a through-hole is provided at each end of the slotted-post insert 650. Of course, additional through-holes may be used. An elongated notch 667, centered on each through-hole 668, is formed in each of side portion 663 and 665.

Figure 13C:
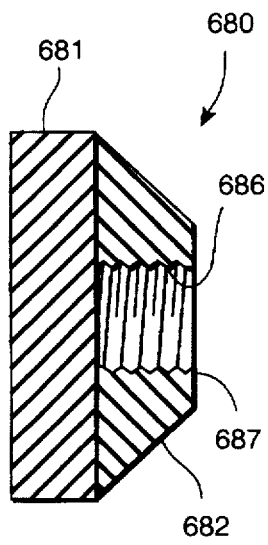
FIGS. 13A, 13B, and 13C, respectively, are enlarged top, cross-sectional major-axis side, and cross-sectional minor-axis side views of an insert lock for use with the slotted-post insert shown in FIGS. 12A through 12D.
Figure 13A:
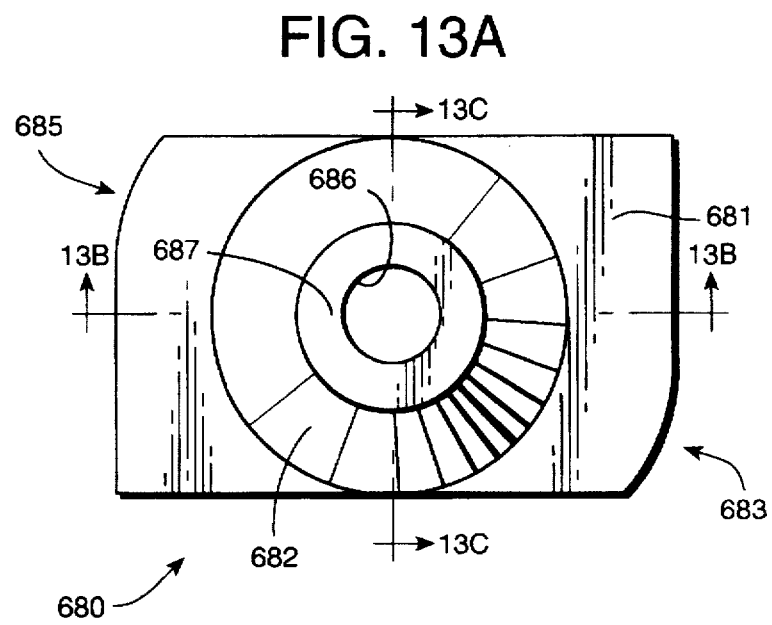
Figure 13B:
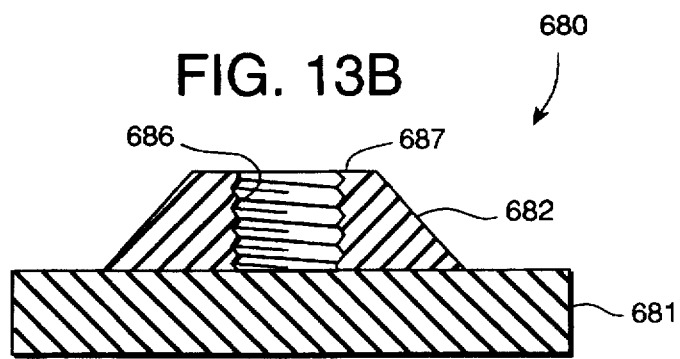

FIGS. 13A through 13C show a lock 680 for use in removably securing the slotted-post insert 650 to a slotted support post. Lock 680 comprises a substantially flat, rectangular engaging portion 681 integrally formed with a truncated conical turning portion including threaded hole 682. Engaging portion 681 includes a pair of diagonally opposed cam surfaces 683, 685.

FIGS. 14A through 14C show the installation of the slotted-post insert 660 in the support post 600 using the lock 680.

The shape of the slotted-post insert 660 is such that it may be inserted lengthwise into a slot formed in support post 600. That is, it is not necessary to feed an end of slotted-post insert 660 into an end of support post 600. However, slotted-post insert 660 must be secured to the support post 600 to prevent it from falling away from the slotted support post.

Accordingly, prior to inserting a slotted-post insert into slot of support post 600, a turning member, such as threaded fastener 670, which may be a machine screw, with a NYLOCK patch inserted into the threaded portion of the screw, is inserted into each through hole 668 formed in slotted-post insert 660. The fastener is threaded into lock 680. A threaded hole 686 is tapped to include a threaded wall 687 through lock 680. Typically, a pair of locks 680 are initially positioned within the slotted-post insert 660 such that their major axis is parallel with the slotted-post insert.

The slotted-post insert 660 can then be positioned in slotted support post 600. Using a conventional tool such, as a screwdriver, the threaded fastener 670 is turned in a clockwise direction, causing it to even more securely engage the lock 680. The NYLOCK patch causes the turning resistance to increase with the rotation of the threaded fastener 670. Of course, other resistance-increasing techniques may also be used such as tapering threaded hole 686. As resistance increases, the turning action will cause lock 680 to rotate in a clockwise direction. Cam surfaces 683 and 685 pass through the notches 667 formed in slotted-post insert 660 and "cam-lock" against opposing interior surfaces of the slot formed in the slotted support 600. Further, turning of threaded fastener 670 will draw up lock 680 so that the edges of engaging portion 681 bear against underside surfaces of a pair of adjacent inside flanges. This operation is performed for each of the locks used to secure a slotted-post insert. The slotted-post insert 660 is now rotatably, but detachably, secured to slotted support post 600 and is ready to receive the mounting brackets of the storage system 1.

Figure 15A:
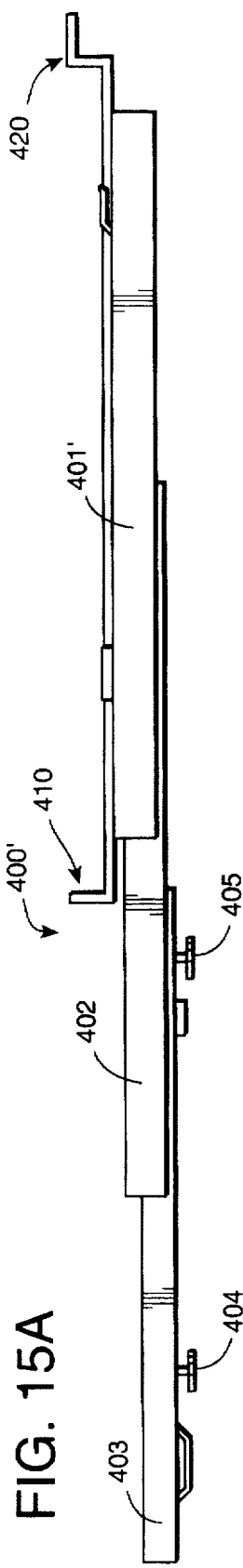
FIG. 15A is a top view of an extended slide assembly for mounting an active-level shelf to the storage system shown in FIG. 1.
Figure 15B:
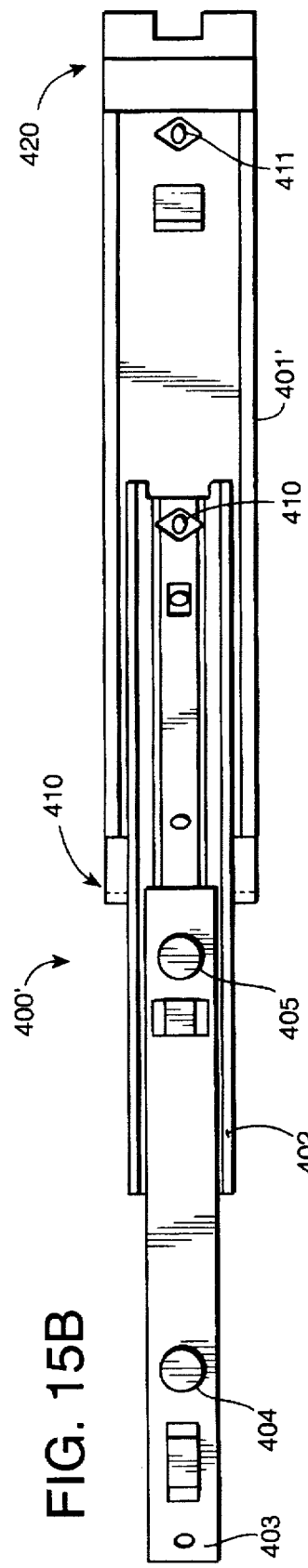
FIG. 15B is a side elevation of the extended slide assembly shown in FIG. 15A.
Figure 15C:
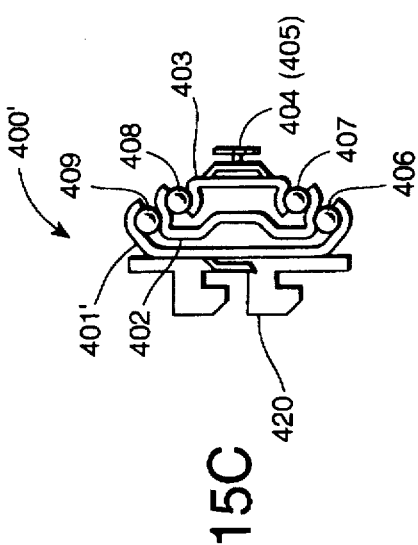
FIG. 15C is an end view of the slide assembly shown in FIGS. 15A and 15B.

FIGS. 15A through 15C, which disclose another embodiment of a slide assembly, are substantially similar to the slide assembly 400, as shown in FIGS. 4A through 4C, respectively, except for the terminal edge portions of a storage system mounting member 401'. Specifically, in the slide assembly 400', one end or edge portion 410 of the mounting member 401' is formed to have the same shape as the end or edge portion 810 of mounting bracket 800 shown in FIGS. 10A through 10C. The other end or edge portion 420 is formed to have the same shape as the end or edge portion 820 shown in FIGS. 10A through 10C. Thus, the need for separate mounting brackets or an integral mounting bracket to secure slide assembly 400' to the support posts is obviated.

Figure 16B:
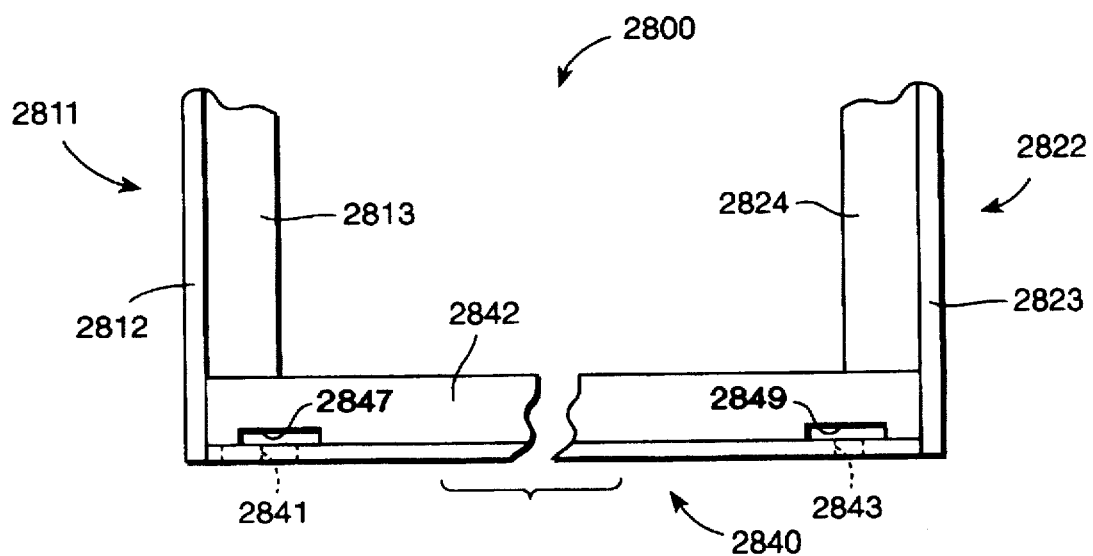
FIG. 16B is a fragmented top view of the active-level storage unit shown in FIG. 16A.
Figure 16A:
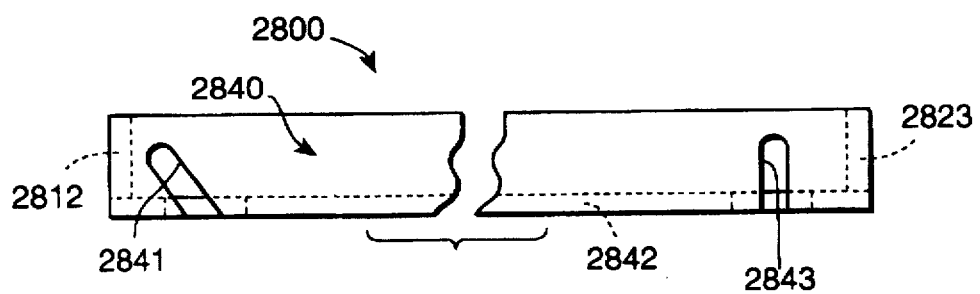
FIG. 16A is a fragmented side view of another embodiment of an active-level storage unit.

FIGS. 16A and 16B show another embodiment of an active-level shelf assembly 2800, including a substantially rectangular frame assembly having a side panel member 2840, front panel member 2811, and a rear panel member 2822. (An opposing side panel member is not shown but is configured in like manner to side panel member 2840.) A lip portion 2842 extends substantially perpendicular adjacent to side panel member 2840. (Again, a similar configuration exists at the opposing side panel.) Similarly, lip portions 2813, 2824 extend substantially adjacent to front and rear panel members 2812, 2823, respectively. The panel members may be made of sheet metal and, if so, maybe secured in position by welding, brazing, or the like. Alternatively, the frame assembly 2800 may be made of plastic as in integral assembly using thermoplastic-forming techniques.

Side panel member 2840 includes a diagonally oriented slot 2841 proximate to a front portion of the side panel member. Slot 2841 extends to the bottom of the frame assembly 2800. Side panel member 2840 also includes a vertically oriented slot 2843 proximate to a rear portion of the side panel member. Slot 2843 also extends to the bottom of the frame assembly 2800.

The distance between the ends of the arcuate top portions of the two slots 2841, 2843 equals the distances between the center lines of the front and rear shoulder rivets.

Lip portion 2842 includes an elongated slot 2847 proximate to and contiguous with slot 2841. Lip portion 2842 also includes another elongated slot 2849 proximate to and contiguous with slot 2843. (Again, the opposing side includes like-shaped and positioned slots.)

To install the frame assembly 2800 to storage system 1, each front shoulder rivet engages a respective one of diagonal slots 2841. One shoulder rivet at the front of slide assembly 400 may be engaged before the opposing side front shoulder rivet because of play in the external slide assembly 400. Then the back of the frame assembly 2800 is allowed to drop down such that the pair of rear rivets engages slots 2843 on opposing sides of frame assembly 2800. Elongated slots 2847 and 2849 allow the head of the shoulder rivets to pass through lip portions 2842. The width of the slots 2841, 2843 is such that the heads of the shoulder rivets cannot pass therethrough. When the frame assembly 2800 is urged fully downward, all shoulder rivets should be lodged against the upper arcuate portion of slots 2841 and 2843 on both sides of the frame assembly 2800.

Figure 17:
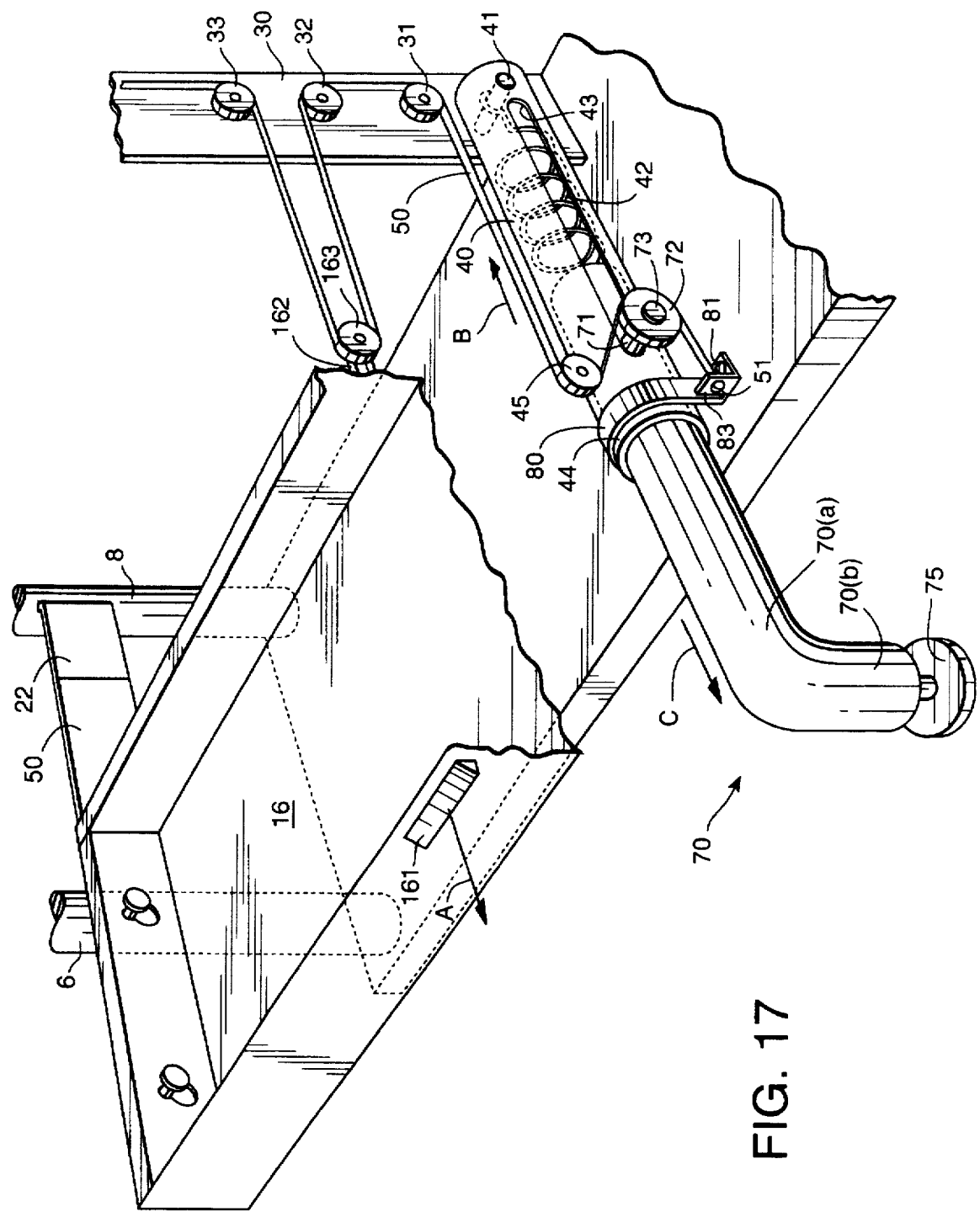
FIG. 17 is a fragmented perspective view of an anti-tip assembly used in the storage system shown in FIG. 1.

FIG. 17 shows the details of an automatic anti-tip leg assembly, which may be optionally used in the present invention. The feature ensures that the stability of the storage system 1 is not compromised when an active-level shelf is pulled out to view or to access items stored thereon.

When an active-level shelf 16 is pulled out by a handle or finger group 161 in the direction depicted by arrow A, a leg 70 will automatically extend in the same direction as indicated by arrow C. This action is effected by means of a cable and pulley system as will now be described in detail.

At the back of the active-level shelf 16, for example, a mounting shackle or bracket 162 is secured to rotatably support plastic guide wheel or pulley 163.

The strut 30, which is positioned substantially at the center of the storage system 1, is secured using known techniques to the fixed top shelf assembly 2 and the fixed base shelf assembly 4. (If there are any other fixed shelves in the storage system 1, strut 30 may also be secured to such shelves.) Strut 30 includes a plurality of pulleys 31, 32, and 33 rotatably mounted thereon.

A guide tube 40 is secured to the bottom of strut 30 by means of a suitable fastener 41 at one end. At an opposing end, guide tube 40 is secured to fixed base shelf assembly 4 by means of a mounting bracket 80 and a plurality of fasteners, one of which is shown by reference numeral 81. Guide tube 40 may be formed of 1.06" I.D. tubing, and leg 70 may be formed of 1" O.D. tubing. The tubing is shown to be circular in cross section. However, other shapes of tubing, such as square or rectangular, may also be used.

A return spring 42 may be secured to a sleeve 71 secured within the end of leg 70 to be inserted in guide tube 40. The other end of the spring may be secured to the fastener 41.

After one end of spring 42 is secured to one end of the L-shaped, tubular, anti-tip leg 70, that end of the leg 70(a) is inserted through a slide bushing 44 positioned in the guide tube 40. Slide bushing 44 may be press-fitted in place or otherwise secured by adhesives or threading. A slot 43 is formed in guide tube 40. Leg 70 is positioned in guide tube 40 so as to align sleeve 71 with slot 43. To do so, leg 70 is rotated so as to bring sleeve 71 into alignment with slot 43 formed in guide tube 40. When so aligned, leg portion 70(b) extends downwardly and should be perpendicular to the supporting surface of the storage system. A pulley 72 is rotatably secured to an end of sleeve 71 proximate to slot 43 by means of a fastener 73, such as a threaded fastener. Once the pulley 72 is secured to sleeve 71, leg 70 will be restricted from being completely withdrawn from guide tube 40.

A pulley 45 is rotatably mounted to guide tube 40 by means of suitable hardware. A cable 50 is threaded or rescued around the several pulleys.

A tab 83 on bracket 80 is provided to secure the cable 50 at one end. The tab may have a simple hole to which the cable is passed through and secured by knotting or the like. Alternatively, a threaded screw 51 may engage the tab, and the cable 50 may be secured to the screw such that the tension of the cable may be adjusted in the event of cable stretching. The other end of the cable 50 may be secured in like manner to an upper portion of the strut 30 and need not be further discussed.

When the active-level shelf 16 is pulled out in the direction indicated by arrow A, this in turn causes the cable 50 between the pulleys 31 and 45 to move in the direction indicated by arrow an B. Since the cable 50 is fixed at both ends, the pulley 72, which is secured to the leg 70, is urged forward, thus extending the leg in a direction indicated by arrow C to an anti-tip position.

Leg portion 70(b) may be fitted with a threaded fastener 75 to allow facile height adjustment thereof.

Figure 18:
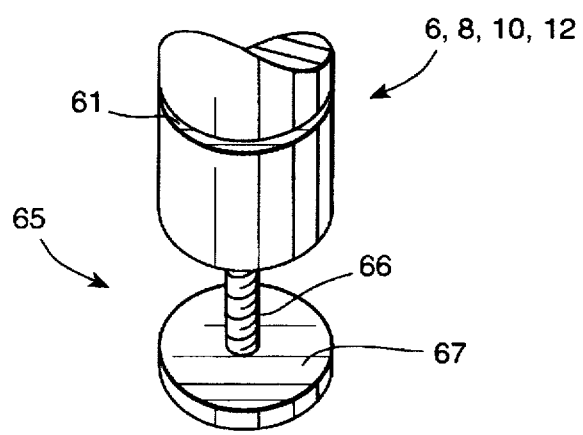
FIG. 18 is a fragmented perspective view of an adjustable leg assembly used in the shelving system shown in FIG. 1.

FIG. 18 shows an alternative as a bottom support post terminus to casters constituting an adjustable foot assembly 65 suitable for use for a stationary storage system especially on an uneven supporting surface. Foot assembly 65 comprises a threaded connecter 66 and a pad 67. The threaded connecter 66 may be threaded into a sleeve (not shown), which is inserted in the bottom of a support post, e.g., 6.

The pad 67 is attached to the threaded connecter 66 to allow it to rotate and pivot. The pad 67 may be made of stainless steel, nylon, or any material suitable for the environment in which the storage system may be used.

One adjustable foot assembly 65 is used for each support post and may be individually adjusted by rotating the threaded connector 66 to ensure that the storage system is stable even if its supporting surface is not even. The rotation and the pivoting of the pad 67 ensures easy rotation of threaded connector 66 to facilitate adjustment and provides even greater stability.

Assembly of the storage system using the support posts shown in FIGS. 8A through 8C now will be described. Supports posts 6, 8, 10, and 12 are passed through corresponding bottom and top collars at each corner of the shelving system 1. The fixed top shelf 2 and the fixed bottom shelf 4 are then secured to a first support post 6 by inserting selected mounting hardware, such as the collars and sleeves discussed previously. Additional support posts 8, 10, and 12 are passed through each of the remaining corner pairs of corresponding base and top collars and are similarly secured.

The assembled storage system is secured because the collars grip the support posts 6, 8, 10, and 12 by means of the sleeves. The rigidity of the storage system 1 is yet further increased by placing downward pressure on the top shelf assembly 2 and the base shelf assembly 4. As noted previously, the load on the storage system in normal use also adds to the rigidity and stability of the storage system. The storage system 1, thus configured, is now ready to receive one or more intermediate fixed- and/or active-level shelf assemblies using the mounting brackets shown in FIGS. 2A through 2D.

Next, assembly of the storage system using the slotted support posts 600 shown in FIGS. 8A through 8C will be described. If the inserts shown in FIGS. 9A through 9C are being used, each insert 650 is inserted in an end of a slotted support post 600 and slid down the length of the support post. If the inserts shown in FIGS. 13A through 13C are being used, typically a pair of locks 680, shown in FIGS. 14A through 14C are loosely secured at opposing ends by threading a fastener 670 into an insert of each lock. The locks are aligned so as to allow the locks to be positioned within a slot of support post 600. The fasteners are turned, causing the camming surfaces 683, 685 of the lock to abut opposing surfaces of the slot after rotating 90°. The fasteners are further turned to tighten their purchase on the insert. When four support posts are prepared, the top shelf assembly and base shelf assembly are secured using the previously described collar and sleeve arrangement. The shelving system is now ready to receive one or more intermediate fixed- and/or active-level shelf assemblies.

The installation of the slide assemblies using the several types of mounting brackets disclosed herein and the mounting of the active-level shelf assemblies have already been discussed and need not be repeated.

Optionally, the components of the anti-tip leg assembly are installed as above-described. The shelving system now is conveniently placed in the vertical position.

Although the storage system 1 has been shown with a top shelf assembly 2 and a base shelf assembly 4 and three intermediate active-level shelf assemblies 14, 16, and 18, other configurations are contemplated. For example, additional intermediate fixed- and active-level shelves may be conveniently added. It will also be understood that the storage system may include fixed-level shelves supported by hanger brackets as disclosed in commonly assigned U.S. application Ser. Nos. 08/093,331 and 08/297,831, which are also incorporated herein by reference. The hanger brackets can be inserted into a slot at the desired height and used to support each truncated corner of the shelf. As an alternative example, the horizontal supporting structure itself could be a wire rod shelf.

Further, if a very tall shelving system is needed, it may be desirable to use an additional shelf assembly of the type used for either the top or base shelf in a central portion of the shelving system. A number of intermediate shelf assemblies may then be inserted between such a "central" shelf assembly and the top shelf assembly and between the central shelf and the base shelf. The addition of one or more of such central shelf assemblies serves to make the storage system even more stable.

Although embodiments of the invention have been depicted as single-storage system units including four support posts, other embodiments also are contemplated, such as single-storage system units having, for example, six support posts. In addition, other embodiments are contemplated which combine a plurality of storage system units into multi-bay storage systems with single-storage system units in side-by-side and/or front-and-back combinations. Such embodiments can be implemented using the structures disclosed herein by one having ordinary skill in the art without undue experimentation.

The present invention may also employ fixed shelves of a variety of types. For example, commonly assigned U.S. patent application Ser. No. 08/093,331 discloses a shelving system that uses hanger brackets to permit easy installation and/or removal of one or more shelves without requiring the disassembly of the entire shelving system. This shelving system is marketed by InterMetro Industries Corporation under its trademark QWIKSLOT®. The QWIKSLOT® shelving system uses support posts formed with a plurality of elongated slots at regular vertical intervals for receiving the hanger brackets. The slotted support post can also have annular grooves as discussed above in the SUPER ERECTA SHELF® shelving system. A notch in each hanger bracket receives a truncated corner of a shelf.

In conclusion, what has been described is an inexpensive, stable, lightweight vertical storage system capable of being very easily assembled and disassembled. In addition, the present invention provides interesting trim and design features which allow attractive commercial applications and otherwise allows for decorative and/or informative displays.

Of course, all specific shapes, dimensions, wire sizes, number of shelves, and materials mentioned herein are provided by way of example only. Storage systems fabricated using different shapes, dimensions, and materials and having a different number of storage levels and combinations of storage level types from those discussed and illustrated herein also are contemplated.

Although specific embodiments of the present invention have been described above in detail, it will be understood that these descriptions are merely for purposes of explanation. Various modifications of equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass all such modifications and equivalent structures.

What is claimed is:

1. A storage system comprising:
   (a) a plurality of support assemblies, each of said plurality of support assemblies including:
      (i) a post having at least one pair of radially extending flanges formed along a length of said post, said pair of flanges defining a longitudinal slot therebetween;
      (ii) a post insert having an array of mounting slots formed therein, said post insert being disposed within said longitudinal slot; and
      (iii) a lock assembly for securing said post insert within said longitudinal slot;
   (b) a lower frame assembly engaged to said plurality of support assemblies;
   (c) an upper frame assembly engaged to said plurality of support assemblies;
   (d) a pair of mounting assemblies, each of said pair of mounting assemblies being engaged to a pair of said support assemblies; and
   (e) an active-level storage unit suspended at each of two opposing sides by a respective one of said pair of mounting assemblies, wherein said active-level storage unit is slidably movable relative to said plurality of support assemblies.

2. The storage system according to claim 1, wherein each mounting assembly in said pair of mounting assemblies comprises:

a slide assembly; and a mounting bracket secured to said slide assembly, said mounting bracket terminating at each end in at least one tab portion, wherein said tab portion is insertable into a mounting slot formed in said post insert.

3. The storage system according to claim 2, wherein said post comprises a hollow cylinder.

4. The storage system according to claim 2, wherein said tab portion comprises a hook-shaped tab.

5. The storage system according to claim 2, wherein each end of said mounting bracket proximate to said tab portion is formed at a substantially 45° angle.

6. The storage system according to claim 2, wherein one end of said mounting bracket is formed to have a substantially 90° angle and the other end of said mounting bracket is formed to have compounded substantially 90° angles.

7. The storage system according to claim 1, wherein said post insert is substantially V-shaped and said array of mounting slots is disposed in at least one column.

8. The storage system according to claim 7, wherein said post insert comprises a pair of notches, each notch being formed in an edge portion of opposing surfaces of said post insert.

9. The storage system according to claim 8, wherein said lock assembly comprises a centrally located, threaded hold and a pair of diagonally opposed camming surfaces and wherein said lock assembly is disposed between said post and said post insert.

10. The storage system according to claim 9, wherein said lock assembly further comprises a turning member extending through a hole formed in said post insert and being threaded into said threaded hold, said lock assembly being positioned proximate to a pair of said notches, wherein said lock assembly is rotated to removably secure said post insert to said post.

11. The storage system according to claim 1, wherein each mounting assembly in said pair of mounting assemblies comprises:
   a slide assembly, and
   a mounting bracket secured to said slide assembly, said mounting bracket terminating at each end in a pair of tab portions,
   wherein each of said pair of tab portions are insertable into a pair of vertically adjacent mounting slots formed in said post insert.

12. The storage system according to claim 11, wherein one end of said mounting bracket is formed to have a substantially 90° angle and the other end of said mounting bracket is formed to have compounded substantially 90° angles.

13. The storage system according to claim 11, wherein said post insert is substantially V-shaped and said array of mounting slots are disposed in two columns, each column being disposed on one of a pair of opposing surfaces of said post insert.

14. The storage system according to claim 13, wherein said post insert comprises a pair of notches, each notch being formed in an edge portion adjacent to a respective one of said opposing surfaces.

15. The storage system according to claim 14, wherein said lock assembly comprises a centrally located, threaded hole and a pair of diagonally opposed camming surfaces and wherein said lock assembly is disposed between said post and said post insert.

16. The storage system according to claim 15, wherein said lock assembly further comprises a turning member extending through a hole formed in said post insert and being threaded into said threaded hole, said lock assembly being positioned proximate to a pair of said notches, wherein said lock assembly is rotated to removably secure said post insert to said post.

17. The storage system according to claim 1, wherein said storage unit comprises:

a storage unit frame assembly mounted to said pair of mounting assemblies.

18. The storage system according to claim 17, wherein said storage unit frame assembly is substantially rectangular and comprises an upper side rail and a lower said rail.

19. The storage system according to claim 18, wherein said storage unit frame assembly further comprises a pair of mounting panels secured to said upper side rail and said lower side rail at opposing sides of said storage unit frame assembly, and
   wherein said pair of mounting panels is mounted to said pair of mounting assemblies.

20. The storage system according to claim 19, wherein each mounting assembly of said pair of mounting assemblies further comprises a plurality of projecting members, and each mounting panel of said pair of mounting panels comprises a plurality of openings, and
   wherein each of said projecting members is insertable into a respective opening for mounting said mounting panels to a respective one of said pair of mounting assemblies.

21. The storage system according to claim 17, wherein said storage unit frame assembly is substantially rectangular and comprises a plurality of panel side members, and
   wherein an opposing pair of panel side members is mounted to said storage unit mounting assembly.

22. The storage system according to claim 21, wherein each mounting assembly of said pair of mounting assemblies comprises a plurality of projecting members, and each mounting panel of said pair of mounting panels comprises a plurality of openings, and
   wherein each of said projecting member is insertable into a respective opening for mounting said pair of mounting panels to said pair of mounting assemblies.

23. The storage system according to claim 17, wherein said storage unit assembly further comprises a storage unit mat assembly supported by said storage unit frame assembly.

24. The storage system according to claim 23, wherein said storage unit mat assembly is substantially rectangular and comprises a plurality of platform rods.

25. The storage system according to claim 23, wherein said storage unit mat assembly is substantially rectangular and comprises a substantially solid sheet.

26. The storage system according to claim 1, wherein said upper frame assembly comprises a top frame assembly and said lower frame assembly comprises a base frame assembly.

27. The storage system according to claim 26, wherein said top frame assembly is substantially rectangular and comprises a plurality of side members with a collar disposed at each corner.

28. The storage system according to claim 27, further comprising a top mat assembly secured to said top frame assembly.

29. The storage system according to claim 26, wherein said lower frame assembly is substantially rectangular and comprises a plurality of side members with a collar portion integrally formed at each corner.

30. A storage system comprising:
   (a) a plurality of support posts;
   (b) a lower frame assembly mounted to said plurality of support posts;
   (c) an upper frame assembly mounted to said plurality of support posts;
   (d) an active-level storage unit supported by said plurality of support posts, wherein said storage unit is slidably movable relative to said plurality of support posts; and (e) and anti-tip assembly secured to said lower frame assembly including:
(i) a guide tube secured to said base assembly, and
(ii) a leg partially disposed and slidable within said guide tube in cooperation with movement of said storage unit.

31. The storage system according to claim 30, wherein said anti-tip assembly further comprises a plurality of pulleys and a cable, wherein said cable is wound around a pulley secured to said storage unit and connected to said leg, and wherein said leg is urged away from said guide tube when said at least one storage unit is pulled away from said storage system.

32. The storage system according to claim 31, further comprising a strut secured at one end to said lower frame assembly and at its opposite end to said upper frame assembly, wherein another pulley of said plurality of pulleys is rotatably mounted on said strut, said cable being wound around said another pulley.

33. The storage system according to claim 32, wherein said anti-tip assembly further comprises a return spring connected at one end to said leg disposed within said guide tube and at an opposite end to said strut, and wherein said leg is urged inside of said guide tube by said return spring.

34. The storage system according to claim 1, wherein said active-level storage unit is disposed between said lower frame assembly and said upper frame assembly.

35. The storage system according to claim 1, wherein said storage unit comprises a shelf.

36. The storage system according to claim 1, wherein said storage unit comprises a bin.

37. The storage system according to claim 1, wherein said storage unit comprises a tray.

38. An anti-tip assembly for use with a storage system having a top assembly, a base assembly, and an active-level storage unit, said anti-tip assembly comprising:

a guide tube secured to said base assembly, and a leg partially disposed and slidable within said guide tube in cooperation with movement of the active-level storage unit.

39. The anti-tip assembly according to claim 38, further comprising a plurality of pulleys and a cable, wherein said cable is wound around a pulley secured to said active-level storage unit and connected to said leg, wherein said leg is urged away from said guide tube when said at least one storage unit is pulled away from said storage system.

40. The anti-tip assembly according to claim 39, further comprising a strut secured at one end to said base assembly and, at its opposite end, to said top assembly, wherein another pulley of said plurality of pulleys is rotatably mounted on said strut, said cable being wound around said another pulley.

41. The anti-tip assembly according to claim 40, further comprising a return spring connected at one end to said leg disposed within said guide tube and at an opposite end to said strut, wherein said leg is urged inside of said guide tube by said return spring.

42. The anti-tip assembly according to claim 38, wherein said leg is substantially L-shaped.

43. A support assembly comprising:

a post having at least one pair of radially extending flanges formed along a length thereof, said flanges defining a longitudinal slot therebetween, and a post insert having an array of mounting slots formed therein, said insert being disposed within said longitudinal slot; and a cam-lock assembly for securing said post insert within said longitudinal slot, wherein said cam-lock assembly is rotatable to bear against opposing interior surfaces of the longitudinal slot.

44. The storage system according to claim 43, wherein said post insert is substantially V-shaped and said array of mounting slots is disposed in at least one column.

45. The storage system according to claim 44, wherein said post insert comprises a pair of notches, each notch being formed in an edge portion of opposing surfaces of said post insert.

46. The storage system according to claim 45, wherein said lock assembly comprises a centrally located, threaded hole and having a pair of diagonally opposed camming surfaces and wherein said lock assembly is disposed between said post and said post insert.

47. The storage system according to claim 46, wherein said lock assembly further comprises a turning member extending through a hole formed in said post insert and being threaded into said threaded hole, said lock assembly being positioned proximate to a pair of said notches, wherein said lock assembly secures said post insert to said post.

* * * * *

UNITED STATES PATENT AND TRADEMARK OFFICE
CERTIFICATE OF CORRECTION

PATENT NO. : 5,797,503

DATED : August 25, 1998

INVENTOR(S) : KENNETH A STEVENS, ET AL.

It is certified that error appears in the above-identified patent and that said Letters Patent is hereby corrected as shown below:

```
COVER PAGE [56] REFERENCES CITED,
Other Publications, "(dte" should read --(date--; and
"Systems" should read --System--.

COLUMN 4,
Line 33, "a" should be deleted.

COLUMN 6,
Line 3, "based" should read --base--.

COLUMN 7,
Line 45, "constitutes" should read --constitute--.

COLUMN 9,
Line 56, "is" should read --are--.

COLUMN 12,
Line 5, "1½" should read --1½"--; and
Line 57, "10c," should read --10C,--.

COLUMN 13,
Line 29, "FIG." should read --FIGS.--.
```

UNITED STATES PATENT AND TRADEMARK OFFICE
CERTIFICATE OF CORRECTION

PATENT NO. : 5,797,503

DATED : August 25, 1998

INVENTOR(S) : KENNETH A STEVENS, ET AL.

It is certified that error appears in the above-identified patent and that said Letters Patent is hereby corrected as shown below:

COLUMN 14,
Line 15, "tool such," should read --tool, such--.

COLUMN 16,
Line 23, "an" should be deleted; and
Line 48, "Supports" should read --Support--.

COLUMN 19,
Line 19, "hold" should read --hole--; and
Line 25, "hold," should read --hole,--.

COLUMN 22,
Line 30, "storage system" should read --support assembly--;
Line 33, "storage system" should read --support assembly--;
Line 37, "storage system" should read --support assembly--; and
Line 42, "storage system" should read --support assembly--.

Signed and Sealed this

Ninth Day of November, 1999

Attest:

Q. TODD DICKINSON

*Attesting Officer*     *Acting Commissioner of Patents and Trademarks*